(12) United States Patent
Ohyama

(10) Patent No.: US 6,512,608 B2
(45) Date of Patent: Jan. 28, 2003

(54) OPTICAL DEVICE

(75) Inventor: Minoru Ohyama, Kanagawa-ken (JP)

(73) Assignee: Victor Company of Japan, Limited, Yokohama (JP)

(*) Notice: Subject to any disclaimer, the term of this patent is extended or adjusted under 35 U.S.C. 154(b) by 32 days.

(21) Appl. No.: 09/736,176

(22) Filed: Dec. 15, 2000

(65) Prior Publication Data

US 2002/0008888 A1 Jan. 24, 2002

(30) Foreign Application Priority Data

Dec. 16, 1999 (JP) ............................................. 11-358069
Oct. 12, 2000 (JP) ....................................... 2000-312436

(51) Int. Cl.[7] ................................................. G02B 5/32
(52) U.S. Cl. ...................... 359/15; 369/44.37; 369/103; 369/116; 250/214 R; 250/216
(58) Field of Search ........................ 359/15; 369/44.37, 369/103, 116; 250/214 R, 216

(56) References Cited

FOREIGN PATENT DOCUMENTS

| JP | 05-101417 | 4/1993 |
| JP | 06-195738 | 7/1994 |

OTHER PUBLICATIONS

Shih, H. et al., *"Holographic Laser Module with Dual Wavelength for DVD Optical Heads"* Tu–D–01 International Symposium on Optical Memory '98 Technical Digest pp. 22–23.

*Primary Examiner*—Cassandra Spyrou
*Assistant Examiner*—Craig Curtis
(74) *Attorney, Agent, or Firm*—Gary M. Nath; Harold L. Novick; Marvin C. Berkowitz

(57) ABSTRACT

There is disclosed an optical device in which a first light source for outputting a first wavelength light is apart from a second light source for outputting a second wavelength light by a predetermined distance. An information recording medium is irradiated with the first and second wavelength lights transmitted through a holographic optical element having first and second diffraction areas. The first and second diffraction areas are provided with grating arrangements in which grating axis directions are parallel to each other and grating pitches are different from each other. The first and second wavelength lights reflected by the information recording medium are transmitted through the holographic optical element and diffracted by the first and second diffraction areas. The first and second wavelength diffracted lights by the first diffraction area are converged to much the same first position on a light receiving element substrate, and the first and second wavelength diffracted lights by the second diffraction area are converged to substantially the same second position on the light receiving element substrate. First and second light receiving elements are disposed in the first and second positions, respectively.

11 Claims, 25 Drawing Sheets

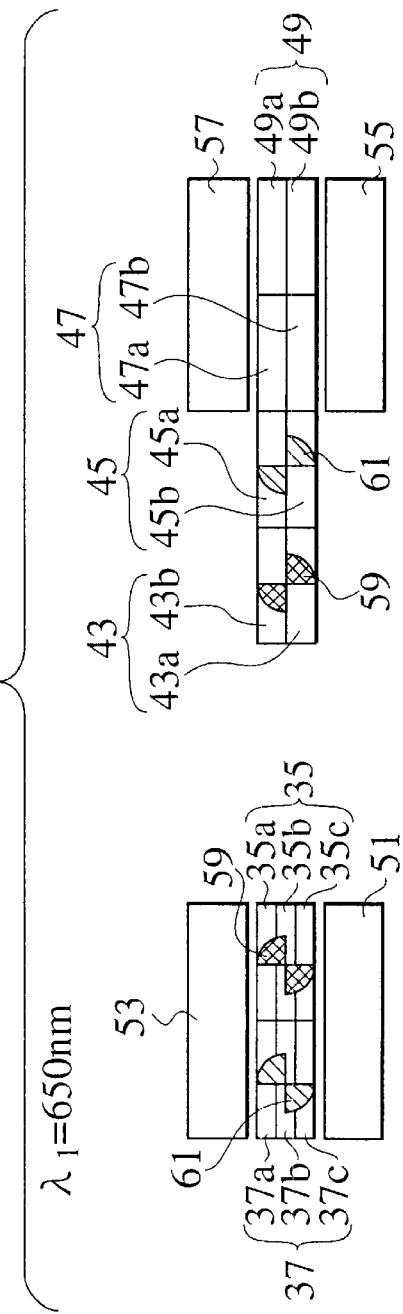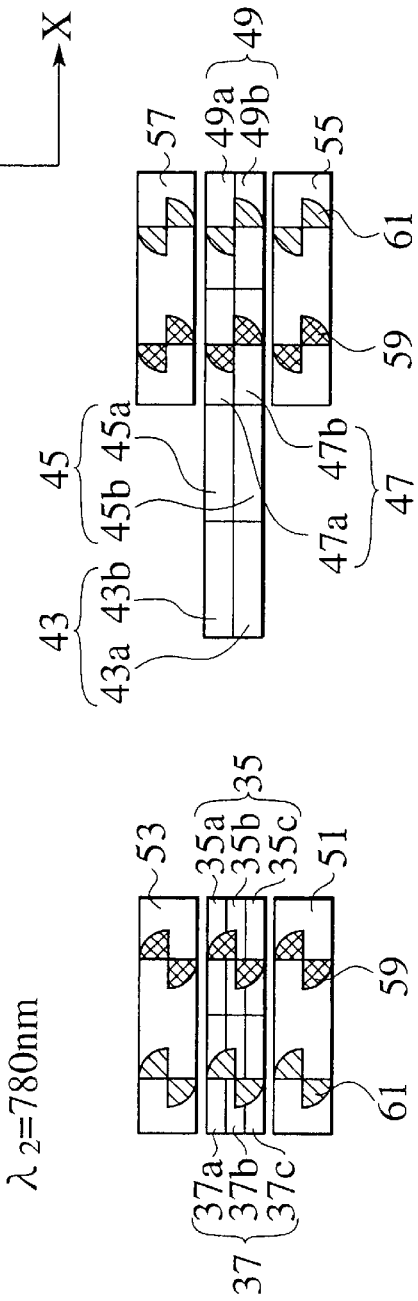

FIG. 7A  FIG. 7B
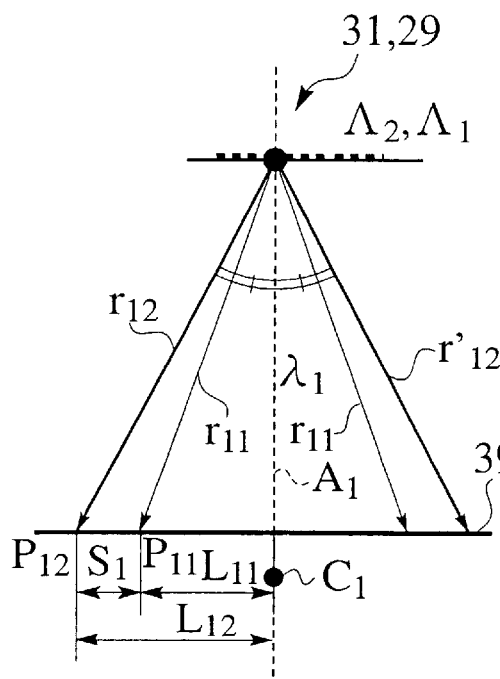
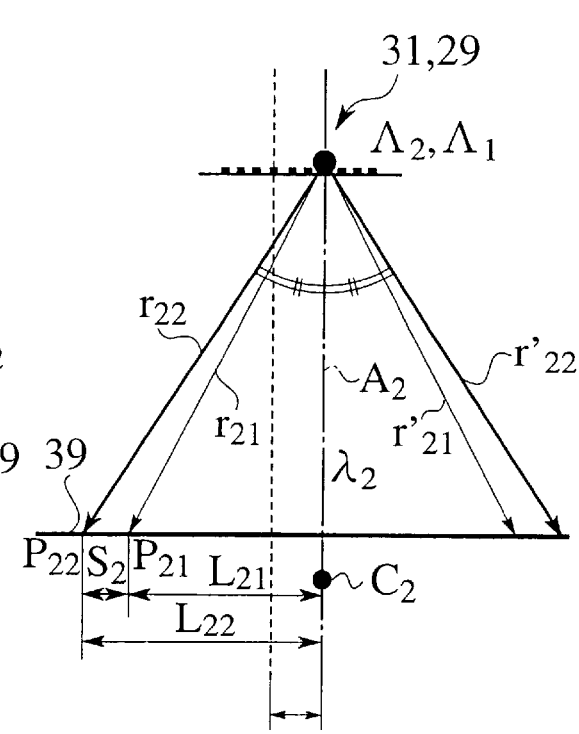
FIG. 7C
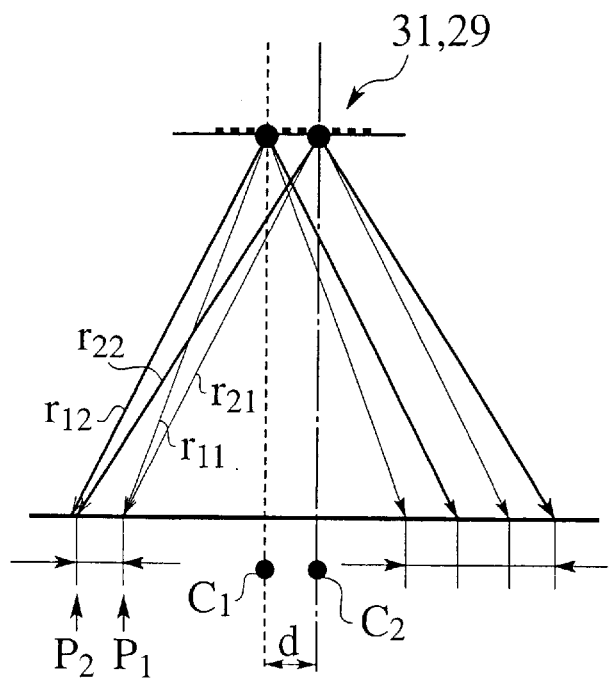

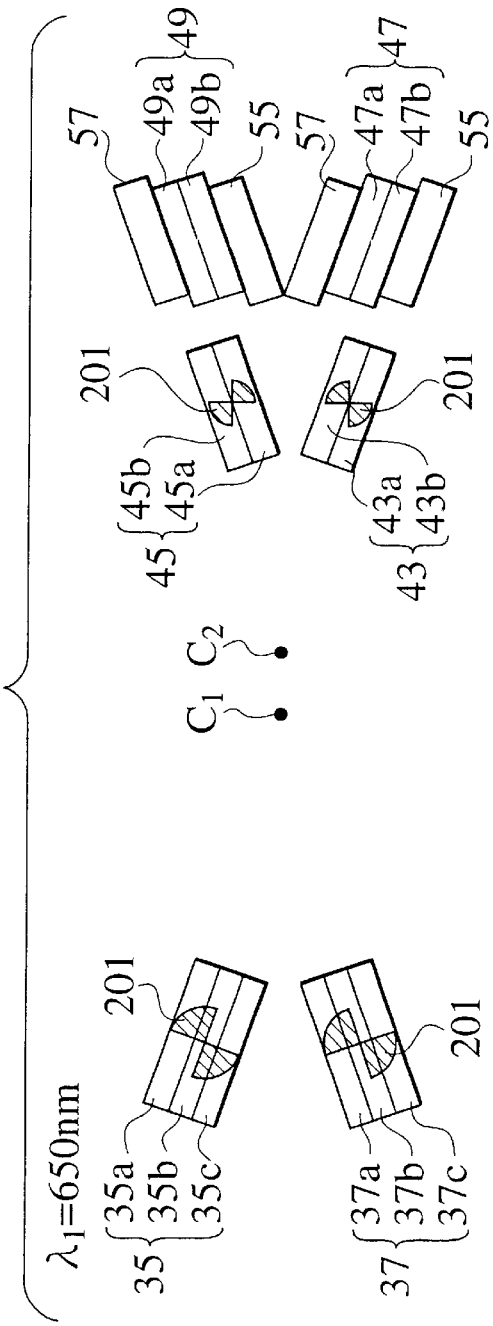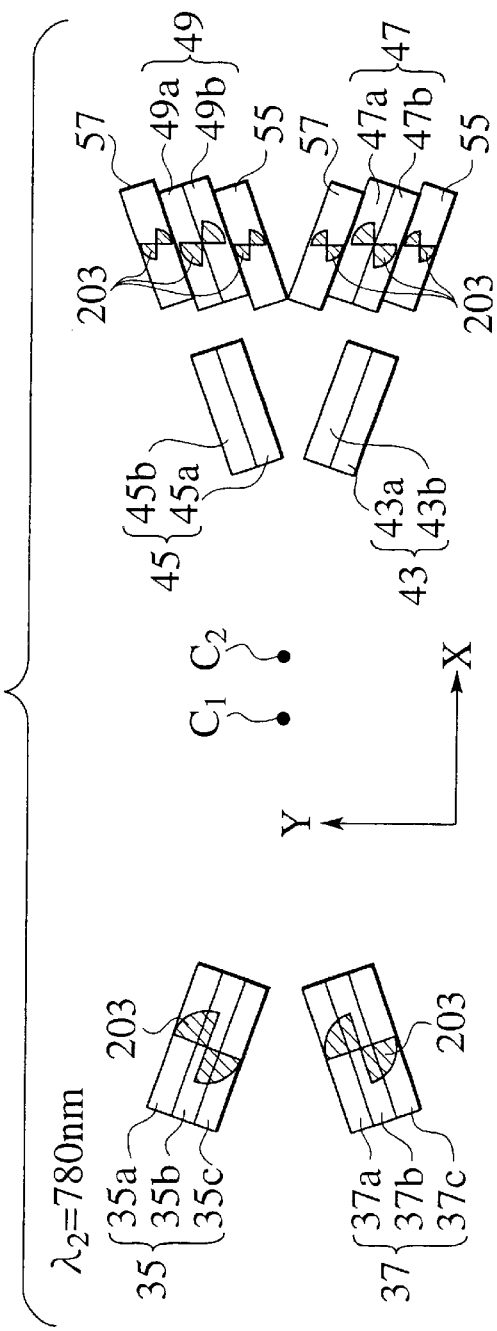

OPTICAL DEVICE

CROSS REFERENCE TO RELATED APPLICATION

This application claims benefit of priority under 35 U.S.C. § 119 to Japanese Patent Applications No. Heill-358069, filed on Dec. 16, 1999 and No. 2000-312436, filed on Oct. 12, 2000, the entire contents of which are incorporated by reference herein.

BACKGROUND OF THE INVENTION

1. Field of the Invention

The present invention relates to an optical device for use in a reading apparatus of an optical information recording medium such as an optical disc, and more particularly, it relates to an optical device which is suitable for a compatible reproduction system of a DVD (known as "Digital Versatile Disc" or "Digital Video Disc") and a compact disc-write once (CD-R) and which can be miniaturized.

2. Description of the Prior Art

In place of a CD as a household optical disc system which has already generally spread, a higher-density DVD system has been proposed/commercialized, and has started to spread in recent years. In a DVD player which is a reproduction apparatus, CD compatible reproduction becomes essential in order to avoid the redundancy or operation intricacy of the apparatus. Moreover, also with respect to a compact disc-write once (CD-R) which can be reproduced by the CD player, a compatible reproduction function is similarly requested. Therefore, a technique for reproducing various normal discs has been developed, and the simplification and cost cutting of a constitution for realizing the technique become themes.

Above all, in the aforementioned CD-R, the reflectance of a recording medium has a large dependence on wavelength, and hence, a laser light source of a 780 nm band different from a 650 nm band for a DVD is essential, and a pickup optical system having a built-in light source of two wavelengths is necessary.

Accordingly, there have been developed a device obtained by mechanically coupling two conventional and independent pickups, a device obtained by independently attaching received/emitted light integration elements for wavelengths, synthesizing them on one optical axis by a dichroic prism, and sharing a partial optical system such as an objective lens, and the like. In addition, another device has been proposed which can be obtained by receiving, in one package, two semiconductor laser chips different in wavelength from each other, setting other components to be independent of one another but setting the optical axis to be common.

On the other hand, with a request for cost down and small size, an attempt to integrate an optical circuit for an optical pickup has also been developed. For example, a device has been developed by unifying a semiconductor laser (LD), a photodetector (PD) and a holographic optical element (HOE), and has been applied to a CD and DVD. Moreover, in a society, further integration with two wavelengths has also been proposed (e.g., ISOM'98 Technical Digest pp22 and subsequent pages, Tu-D-01).

As described in the above document, in an integrated device in which the semiconductor laser can be disposed very close to the photodetector, it is easily possible to dispose a light receiving portion of a diffracted light by the holographic optical element and a light emitting point of the semiconductor laser in a substantially conjugate position. Therefore, focus error detection can be realized by a complementary spot size detection method (SSD method) in which ±1st order diffracted lights by the holographic optical element are both utilized. This method is advantageous as compared with another practical "knife edge method" in that strict position adjustment of the holographic optical element is not necessarily required, it is unnecessary to discard one of the ±1st order diffracted lights and high efficiency is obtained.

FIGS. 1A and 1B are explanatory views showing the focus error detection by the aforementioned spot size detection (SSD) method (Japanese Patent Application Laid-Open No. 101417/1993). More specifically, FIG. 1A is a schematic side view of an apparatus for performing the focus error detection, and FIG. 1B is a schematic plan view of a photodiode for detecting the diffracted light in the apparatus.

As shown in FIG. 1A, in this focus error detection apparatus, a reflected light reflected by an optical disc 357 is transmitted through an objective lens 356 and separated into a pair of conjugate lights b1, b1' by a holographic optical element 355. Here, the holographic optical element 355 is constituted in such a manner that the conjugate light b1 is focused above a light receiving element substrate 350, and the conjugate light b1' is focused below the substrate 350.

Moreover, as shown in FIG. 1B, the respective conjugate lights b1, b1' are received by photo detection diodes 352 and 353 disposed in the light receiving element substrate 350. The photo detection diodes 352 and 353 are divided into three areas 352$a$, 352$b$, 352$c$ and 353$a$, 353$b$, 353$c$ in Y direction crossing at right angles to X direction in which the conjugate lights b1 and b1' are separated.

By this constitution a laser light focus error signal FE to the optical disc 357 is given by the following equation when outputs of the light receiving areas 352$a$, 352$b$, 352$c$ are w1, w2, w3, respectively, and outputs of the light receiving areas 353$a$, 353$b$, 353$c$ are w4, w5, w6, respectively:

$$FE=(w1+w3+w5)-(w2+w4+w6) \quad (1)$$

Specifically, when a laser light emitted from a laser light source 351 and raised by a raising mirror 354 is incident upon the optical disc 357 via the objective lens 356, and a focus of the laser light is adjusted with respect to the disc 357, a spot S1 on the photo detection diode 352 becomes the same in size as a spot S2 on the photo detection diode 353, and the focus error signal FE of the equation (1) turns to zero. On the other hand, when the focus of the laser light deviates from the optical disc 357, the spot S1 on the photo detection diode 352 becomes different in size from the spot S2 on the photo detection diode 353, and the focus error signal FE of the equation (1) indicates a positive or negative value other than zero. Therefore, a polarity of the focus error signal FE is reversed before and after a focusing point. Therefore, by detecting the focus error signal FE, focus adjustment of the laser light with respect to the optical disc 357 can be performed.

Additionally, when the focus error detection by the spot size detection method and the 2-wavelength optical system are to be both established, the dependence of a diffraction angle by the holographic optical element on the wavelength raises a problem.

Specifically, in a diffraction grating, the diffraction angle and other characteristics are determined by a mathematical relation between a period structure and light wavelength, and therefore the diffraction angle largely changes with respect to different wavelengths. More specifically, in the "spot size detection method" as the focus error detection method suitable for the integrated device using the holographic optical element, it is essential to dispose a photodetector light receiving surface for detecting the holographic optical element diffracted light in the very vicinity of the conjugate point of the semiconductor laser light emitting point. However, when lights with different wavelengths are incident upon the same holographic optical element, an optimum photodetector light receiving surface position largely differs by the characteristic change. Therefore, it has been difficult to integrate the semiconductor laser and photodetector on the same photodetector substrate. Moreover, also with respect to aberration correction or the like for optimizing a holographic optical element lens action, it has been difficult to derive a compatible solution.

For example, in the aforementioned 2-wavelength integrated device (ISOM '98 Technical Digest pp22 and subsequent pages, Tu-D-01), only one of the ±1st order diffracted lights is used for each wavelength, and the complementary constitution is not realized.

Moreover, in a DVD-RAM, tracking error detection of a differential push-pull (DPP) system is preferable, but in an integrated pickup using hologram or the like to satisfy small size, high rate and low cost, it has been difficult to realize the tracking error detection of the DPP method for the DVD-RAM without causing cost up or performance deterioration.

SUMMARY OF THE INVENTION

Therefore, an object of the present invention is to provide an optical device which realizes complementary focus error detection with respect to two wavelengths in an optical system using lights of two wavelengths.

In order to achieve the aforementioned object, according to an aspect of the present invention, there is provided an optical device for reading information from an information recording medium, comprising: a first light source for outputting a light of a first wavelength; a second light source for outputting a light of a second wavelength; a holographic optical element having a first diffraction area and a second diffraction area for diffracting the lights of the first and second wavelengths; and a light receiving element substrate provided with a first light receiving element and a second light receiving element for receiving a diffracted light from the holographic optical element, wherein the first diffraction area and the second diffraction area have grating arrangements whose grating axis directions are parallel to each other and whose grating pitches are different from each other, light emitting points of the first and second light sources are apart from each other by a predetermined distance in a direction crossing at right angles to the grating axis, the grating pitches of the first diffraction area and the second diffraction area are determined in such a manner that: when a distance ($L11;L12$) between an incident position of the diffracted light of the first wavelength to the surface of the light receiving element substrate by the first diffraction area or the second diffraction area, and an optical axis determined by a 0th order transmitted light of the first wavelength is a first distance, and a distance ($L21;L22$) between an incident position of the diffracted light of the second wavelength to the surface of the light receiving element substrate by the same diffraction area, and the optical axis determined by the 0th order transmitted light of the second wavelength is a second distance, a difference ($|L11-L21|$; $|L12-L22|$) between the first distance and the second distance becomes substantially equal to an interval between the light emitting points of the first and second light sources; and an interval ($|L11-L12|$; $|L21-L22|$) between the incident position of the diffracted light of the first or second wavelength to the light receiving element substrate surface by the first diffraction area, and the incident position of the diffracted light of the same wavelength to the light receiving element substrate surface by the second diffraction area becomes substantially equal to the interval between the light emitting points, the diffracted lights of the first wavelength and the second wavelength by the first diffraction area are converged to much the same first position on the light receiving element substrate, and the diffracted lights of the first wavelength and the second wavelength by the second diffraction area are converged to substantially the same second position on the light receiving element substrate, and the first and second light receiving elements are disposed in the first and second positions, respectively.

In a preferred embodiment of the present invention, a focus error signal is obtained on the basis of signals from the first light receiving element and the second light receiving element.

In a preferred embodiment of the present invention, the diffracted lights to the first and second positions are both +1st order diffracted lights by the first diffraction area and the second diffraction area, and the interval between the light emitting points of the first and second light sources and the grating pitches of the first diffraction area and the second diffraction area are set in such a manner that −1st order diffracted lights of the first wavelength and the second wavelength by the first diffraction area and the second diffraction area are converged to third, fourth, fifth, sixth positions apart from one another by a predetermined interval capable of receiving the lights in independent light receiving areas not superposed to one another on the light receiving element substrate.

In a preferred embodiment of the present invention, the −1st order diffracted lights of the first wavelength by the first diffraction area and the second diffraction area are converged to the third and fourth positions, the −1st order diffracted lights of the second wavelength by the first diffraction area and the second diffraction area are converged to the fifth and sixth positions, a tracking error signal for the first wavelength is obtained on the basis of detection signals from the light receiving elements disposed in the third and fourth positions, and a tracking error signal for the second wavelength is obtained on the basis of the signals from the light receiving elements disposed in the fifth and sixth positions or the signals from the light receiving elements disposed on both side areas opposite to each other in a grating axis direction of the fifth or sixth position.

In a preferred embodiment of the present invention, when the information recording medium is a CD-R, the tracking error signal for the second wavelength is obtained on the basis of the signals from the light receiving elements disposed in the fifth and sixth positions.

Moreover, in order to achieve the aforementioned object, according to another aspect of the present invention, there is provided an optical device for reading information from an information recording medium, comprising: a first light source for outputting a light of a first wavelength; a second light source for outputting a light of a second wavelength; a holographic optical element having a first diffraction area and a second diffraction area for diffracting the lights of the first and second wavelengths; and a light receiving element substrate provided with a first light receiving element and a second light receiving element for receiving a diffracted light from the holographic optical element, wherein in the first diffraction area and the second diffraction area, grating pitches are identical with each other, grating axis directions are different from each other by a predetermined angle of 30° or less, and light emitting points of the first and second light sources are apart from each other by a predetermined distance in a direction substantially crossing at right angles to the grating axis direction, the grating pitches of the first diffraction area and the second diffraction area are determined in such a manner that: when a distance between an incident position of the diffracted light of the first wavelength to the surface of the light receiving element substrate by the first diffraction area or the second diffraction area, and an optical axis determined by a 0th order transmitted light of the first wavelength is a first distance, and a distance between an incident position of the diffracted light of the second wavelength to the surface of the light receiving element substrate by the same diffraction area, and the optical axis determined by the 0th order transmitted light of the second wavelength is a second distance, a difference between the first distance and the second distance substantially becomes equal to an interval between the light emitting points of the first and second light sources, directions of the first diffraction area and the second diffraction area are determined in such a manner that: the diffracted lights of the first wavelength and the second wavelength by the first diffraction area are converged to much the same first position on the light receiving element substrate; and the diffracted lights of the first wavelength and the second wavelength by the second diffraction area are converged to substantially the same second position apart from the first position by a predetermined distance in a direction crossing at right angles to the light emitting point apart direction on the light receiving element substrate, and the first and second light receiving elements are disposed in the first and second positions, respectively.

In a preferred embodiment of the present invention, a focus error signal is obtained on the basis of signals from the first light receiving element and the second light receiving element.

In a preferred embodiment of the present invention, the diffracted lights to the first and second positions are both +1st order diffracted lights by the first diffraction area and the second diffraction area, a tracking error signal of the first wavelength light is obtained on the basis of signals from the light receiving elements disposed in the third and fourth positions in which the −1st order diffracted lights of the first wavelength by the first diffraction area and the second diffraction area are converged on the light receiving element substrate, and a tracking error signal of the second wavelength light is obtained on the basis of the signals from the light receiving elements disposed in the fifth and sixth positions in which the −1st order diffracted light of the second wavelength by the first diffraction area or the second diffraction area is converged on the light receiving element substrate or the signals from the light receiving elements disposed on both side areas opposite to each other in a grating axis direction of the fifth position or the sixth position.

In a preferred embodiment of the present invention, when the information recording medium is a CD-R, the tracking error signal for the second wavelength is obtained on the basis of the signals from the light receiving elements disposed in the fifth and sixth positions.

In a preferred embodiment of the present invention, the first light receiving element and the second light receiving element are divided into a plurality of sub areas by a plurality of division lines, and the focus error signal is obtained on the basis of the signals from the plurality of sub areas.

In a preferred embodiment of the present invention, when a point at which the 0th order transmitted light intersects the light receiving element substrate is P, an angle formed by a radial axis defined in a radial direction crossing at right angles to a track of the information recording medium and a straight line connecting the first or second position to the intersection point P is $\theta_1$, and an angle formed by the radial axis and the plurality of division lines is $\theta_2$, a relation of $0<\theta_2<\theta_1$ is satisfied.

Moreover, in order to achieve the aforementioned object, according to still another aspect of the present invention, there is provided an optical device for using a laser light having a predetermined wavelength to read information from an information recording medium, comprising: a laser light source for generating the laser light; a light receiving element substrate provided with a plurality of light receiving areas in the same plane; a 3-beam generating diffraction grating for branching the laser light from the laser light source to three emitted lights; and a holographic optical element, divided into at least a first area and a second area in the same plane, for branching a reflected light from the information recording medium and turning the light to the light receiving element substrate, wherein diffraction axes of the first area and the second area are formed in such a manner that a diffraction axis direction of ±1st order diffracted lights by the first area and the diffraction axis direction of the ±1st order diffracted lights by the second area form predetermined angles in opposite directions with respect to a radial axis crossing at right angles to a track of the information recording medium, and the holographic optical element first area and second area, and 3-beam generating diffraction grating are constituted in such a manner that when one of the ±1st order diffracted lights branched by the 3-beam generating diffraction grating is a first side beam, and the other is a second side beam, the diffracted light of the first side beam by the first area is overlapped with the diffracted light of the second side beam by the second area on the light receiving element substrate.

In a preferred embodiment of the present invention, a focus error signal is obtained on the basis of signals from a first light receiving element and a second light receiving element disposed in a first position in which the diffracted light diffracted by the first diffraction area is converged on the light receiving element substrate and a second position in which the diffracted light diffracted by the second diffraction area is converged on the light receiving element substrate, respectively.

In a preferred embodiment of the present invention, the diffracted lights to the first and second positions are both +1st order diffracted lights by the first diffraction area and the second diffraction area, and a tracking error signal is obtained on the basis of signals from the light receiving elements disposed in the third and fourth positions in which −1st order diffracted lights by the first diffraction area and the second diffraction area are converged on the light receiving element substrate, and the signals from four light receiving elements, disposed on the light receiving element substrate, for detecting the +1st order diffracted light of the second side beam by the first area, the +1st order diffracted light of the second side beam by the second area, the −1st order diffracted light of the second side beam by the first area, and the −1st order diffracted light of the second side beam by the second area, respectively.

The nature, principle and utility of the invention will become more apparent from the following detailed description when read in conjunction with the accompanying drawings.

BRIEF DESCRIPTION OF THE DRAWINGS

In the accompanying drawings:

FIGS. 5A and 5B are explanatory plan views showing constitution and action of first to tenth light receiving elements in the first embodiment.

FIGS. 7A to 7C are explanatory views showing the manufacture method of the first embodiment.

FIG. 13 is an explanatory plan view showing constitutions of first to sixth, ninth and tenth light receiving elements in the second embodiment.

DETAILED DESCRIPTION OF THE PREFERRED EMBODIMENTS

Embodiments of the present invention will be described hereinafter with reference to the drawings. In the respective drawings, the same or similar element is shown by the same or similar numeral.

<First Embodiment>

Figure 1A:
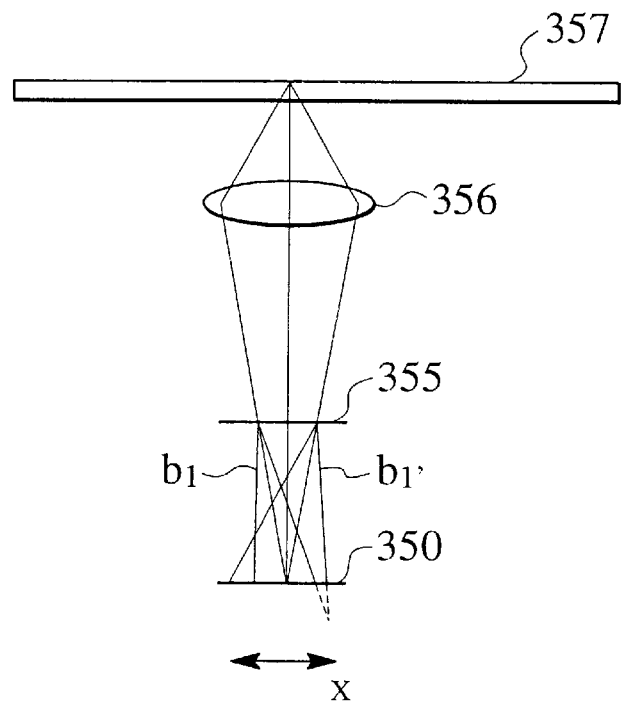
FIGS. 1A and 1B are explanatory views showing focus error detection by a spot side detection method.
Figure 1B:
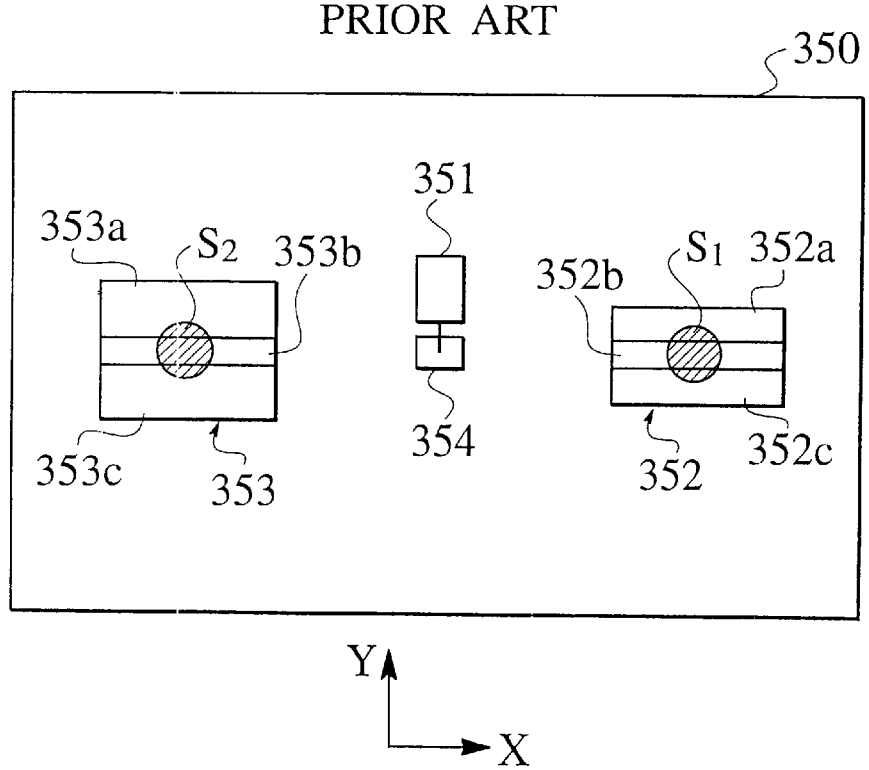
Figure 2:
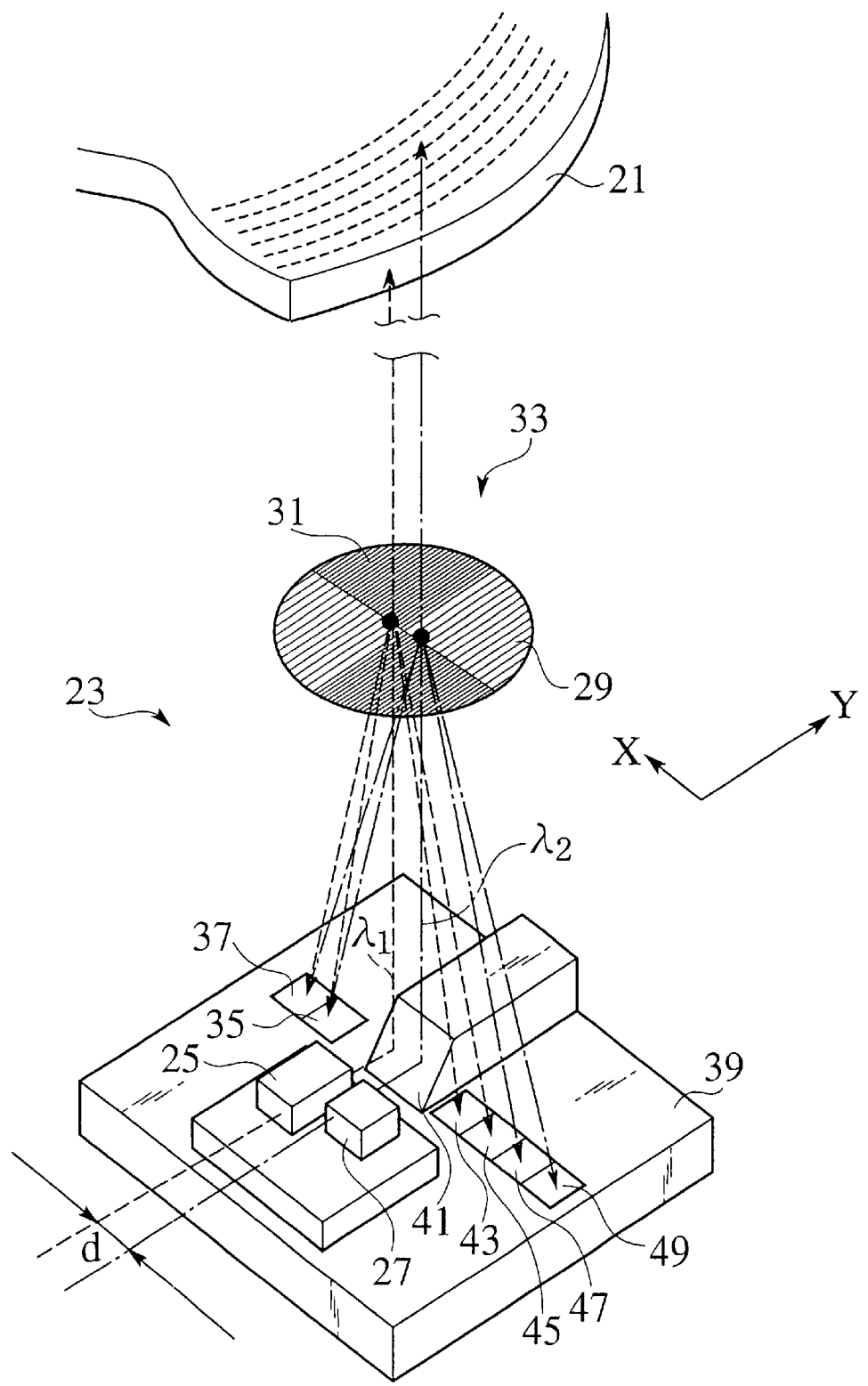
FIG. 2 is a schematic perspective view of a first embodiment of an optical device of the present invention.
Figure 3:
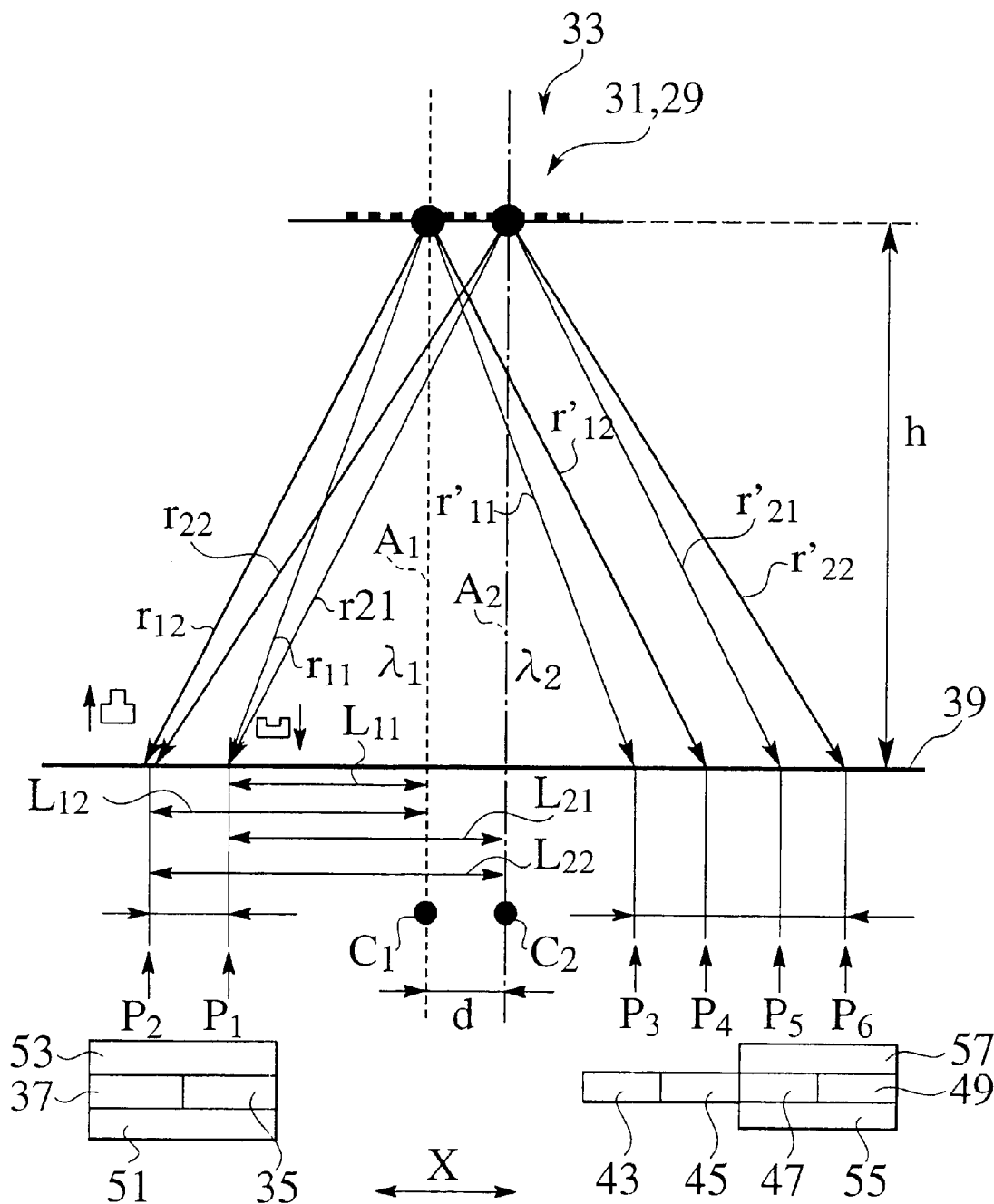
FIG. 3 is an explanatory view showing a light trace or the like of a diffracted light in the first embodiment.

FIG. 2 is a perspective view of a first embodiment of an optical device of the present invention, and FIG. 3 is an explanatory view showing a light trace or the like of a diffracted light in the first embodiment.

As shown in FIGS. 2 and 3, an optical device 23 of the first embodiment is used in an optical pickup for reading information from an information recording medium 21 such as a DVD or CD, and provided with a first light source 25 for outputting a light of a first wavelength $\lambda 1$, and a second light source 27 for outputting a light of a second wavelength $\lambda 2$. Here, the first wavelength $\lambda 1$ is, for example, 650 nm for the DVD, and the second wavelength $\lambda 2$ is, for example, 780 nm for the CD.

The first light source 25 is apart from the second light source 27 by a predetermined distance d in a direction (X axis direction) crossing at right angles to a grating axis direction (Y axis direction) of a holographic optical element described later. It is to be noted that FIG. 3 shows conjugate points C1, C2 of light emitting points of the light sources 25, 27. The conjugate points C1, C2 show image positions of the light emitting points of the first and second light sources 25, 27 by a reflection mirror 41 shown in FIG. 2.

The optical device 23 is further provided with a holographic optical element 33 including a first diffraction area 29 and a second diffraction area 31 for diffracting the lights of the first and second wavelengths reflected by the information recording medium 21.

Figure 4:
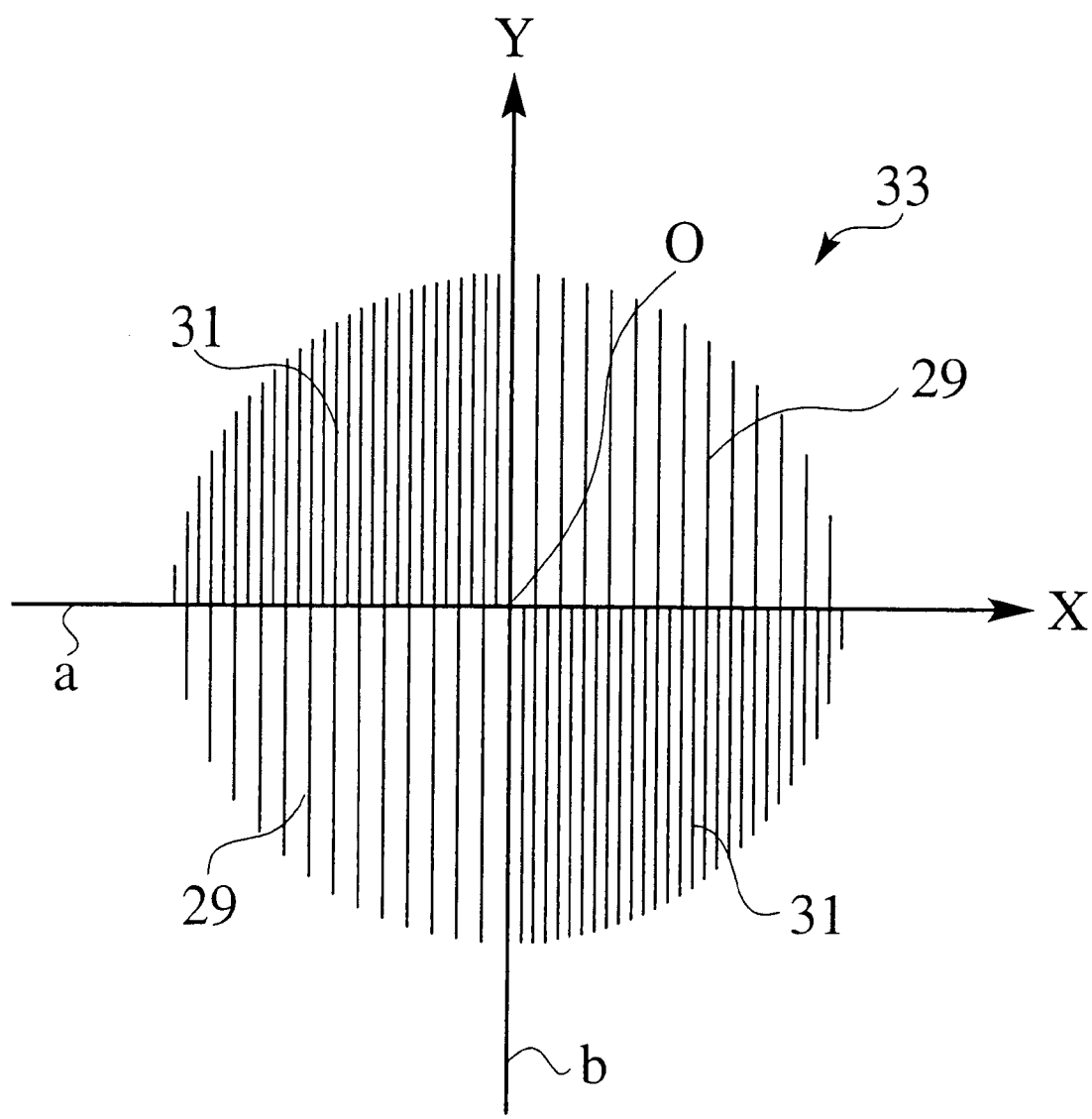
FIG. 4 is a schematic view of a holographic optical element in the first embodiment.

As shown in FIG. 4, the first diffraction area 29 and second diffraction area 31 of the holographic optical element 33 are formed in positions present in a pair of diagonal directions and positions present in another pair of diagonal directions when a circular area on a substrate (not shown) of the holographic optical element 33 is divided by a straight line a extending along X axis direction and a straight line b extending along Y axis direction. Moreover, a grating pitch $\Lambda 1$ of the first diffraction area 29 is set to be larger than a grating pitch $\Lambda 2$ of the second diffraction area 31. Therefore, when one wavelength light is incident, a diffraction angle of the diffracted light by the first diffraction area 29 becomes smaller than the diffraction angle of the diffracted light (of the same dimension) by the second diffraction area 31.

Referring again to FIG. 3, optical axes A1, A2 determined by 0th order transmitted lights of the first and second wavelengths $\lambda 1$, $\lambda 2$ go through the conjugate points C1, C2 and extend at right angles to both X and Y axes.

When the distance d between the light emitting points of the first light source 25 and second light source 27 is given, the grating pitches $\Lambda 1$, $\Lambda 2$ of the first diffraction area 29 and second diffraction area 31 are determined to satisfy the following two conditions.

1) When a distance L11 (l12) between an incident position P1 (P2) of a ±1st order diffracted light r11 (r12) of the first wavelength λ1 to the surface of the light receiving element substrate 39 by the first diffraction area 29 (or the second diffraction area 31), and an optical axis A1 determined by a 0th order transmitted light of the first wavelength λ1 is a first distance, and a distance L21 (L22) between the incident position P1 (P2) of a diffracted light r21 (r22) of the second wavelength λ2 to the surface of the light receiving element substrate 39 by the same diffraction area 29 (31), and an optical axis A2 determined by the 0th order transmitted light of the second wavelength λ2 is a second distance, a difference |L11−L21| (|L12−L22|) between the first distance and the second distance becomes substantially equal to an interval d between the light emitting points of the first and second light sources.

2) An interval |L11−L12| (|L21−L22|) between the incident position P1 of the diffracted light r11 (r21) of the first wavelength λ1 (or the second wavelength λ2) to the light receiving element substrate 39 surface by the first diffraction area 29 and the incident position P2 of the diffracted light r12 (r22) of the same wavelength λ1 (λ2) to the light receiving element substrate surface by the second diffraction area 31 becomes substantially equal to the interval d between the light emitting points.

Here "substantially equal (the same)" preferably means "equal (the same) with an error of 50 μm or less", more preferably means "equal (the same) with an error of 20 μm or less", and further preferably means "equal (the same) with an error of about 1 μm".

More specifically, when an interval h between the light receiving element substrate 39 and the holographic optical element 33 is, for example, 3000 μm, and the distance d is set, for example, to about 100 μm, Λ1 and Λ2 are set, for example, to about 4 μm and 3.3 μm, respectively.

As shown in FIG. 3, by the aforementioned constitution, the light with the first wavelength λ1 from the first light source 25 is reflected by the information recording medium 21, and then diffracted by the first and second diffraction areas 29, 31 to generate the first and second diffracted lights r11, r12. Subsequently, the diffracted light r11 is converted to the first position P1 on the light receiving element substrate 39, and the diffracted light r12 is converged to the second position P2 on the light receiving element substrate 39. In this case, the distance between the first position P1 and the second position P2 is about 100 μm.

Moreover, the light with the second wavelength λ2 from the second light source 27 is reflected by the information recording medium 21, and subsequently diffracted by the first and second diffraction areas 29, 31 to produce the first and second diffracted lights r21, r22. Subsequently, the first diffracted light r21 is converged to the first position P1 on the light receiving element substrate 39 in an error range of about 10 μm, and the second diffracted light r22 is converged to the second position P2 on the light receiving element substrate 39 in the error range of about 10 μm.

A first light receiving element 35 and a second light receiving element 37 each having a width of about 100 μm in X axis direction are disposed in the first position P1 and second position P2. Therefore, the diffracted lights r11, r21 are both converged onto the first light receiving element 35, and the diffracted lights r12, r22 are both converged onto the second light receiving element 37.

Additionally, when a lens power is applied to the first diffraction area 29 and second diffraction area 31, the lens power is applied in such a manner that a concave lens acts on the diffracted lights r11, r21, and a convex lens acts on the diffracted lights r12, r22. Therefore, based on outputs from the first light receiving element 35 and second light receiving element 37, a focus error signal by a complementary spot size detection method can be obtained.

Moreover, by setting the interval d between the first and second light sources and the grating pitches Λ1, Λ2 as described above, −1st order diffracted lights r11', r12', r21', r22' of the first and second wavelengths by the first and second diffraction areas 29, 31 are respectively converged to a third position P3, fourth position P4, fifth position P5, and sixth position P6 apart from one another by about 100 μm on the light receiving element substrate 39 (FIG. 3).

Moreover, a third light receiving element 43, fourth light receiving element 45, fifth light receiving element 47, sixth light receiving element 49 each having a width of about 100 μm in the X axis direction are disposed in the third position P3, fourth position P4, fifth position P5, and sixth position P6.

Therefore, the −1st order diffracted lights r11', r12', r21', r22' of the first and second wavelengths are converged onto the third light receiving element 43, fourth light receiving element 45, fifth light receiving element 47, and sixth light receiving element 49, respectively.

Therefore, as described later, based on output signals from the third and fourth light receiving elements 43, 45, a tracking error signal of a DVD luminous flux having the first wavelength λ1 can be obtained.

Moreover, by the output signals from the fifth and sixth light receiving elements 47, 49 disposed in the fifth and sixth positions P5, P6, the tracking error signal of a CD-R luminous flux can be obtained.

Furthermore, as not shown, in the first embodiment of the optical device, in order to detect a tracking error of the CD luminous flux (second wavelength λ2) by a 3-beam method, a 3-beam generating diffraction grating (not shown) is disposed between the second light source 27 and the information recording medium 21. This 3-beam generating diffraction grating (not shown) can be disposed, for example, on a surface opposite to a surface on which the holographic optical element 31 is disposed in a diffraction element substrate (not shown) provided with the holographic optical element 31.

Additionally, for tracking error detection by the 3-beam method, a seventh light receiving element 51 and an eighth light receiving element 53 are disposed on both sides of the first and second light receiving elements 35, 37. Moreover, ninth and tenth light receiving elements 55, 57 are disposed on both sides of the fifth and sixth light receiving elements 47, 49.

By the aforementioned constitution, the CD luminous flux emitted from the second light source 27 is branched to three luminous fluxes arranged in a tangential direction (Y axis direction) of the information recording medium 21 by the 3-beam generating diffraction grating (not shown). In this case, by appropriately setting a grating depth (for example, to 650 nm for phase modulation of 2 nπ), only with the wavelength of the CD luminous flux, a diffraction action is advantageously generated.

The three luminous fluxes are reflected by the information recording medium 21, then diffracted by the first and second diffraction areas 29, 31, diffracted with the same diffraction angle as that of the diffracted lights r21, r22, r21', r22', and converged onto the light receiving elements 55, 47(49), 57 or the light receiving elements 51, 35(37), 53 arranged in the Y axis direction on the light receiving element substrate 39. Therefore, based on outputs from the light receiving elements 51, 53, 55, 57, the tracking error signal of the CD luminous flux by the 3-beam method can be obtained.

FIGS. 5A and 5B show detailed constitution and action of the first and second light receiving elements 35, 37, and the third to tenth light receiving elements 43 to 57.

Here, FIG. 5A shows a relation between the respective light receiving elements and respective diffracted light spots when the diffracted lights r11, r12, r11', r12' having the first wavelength λ1 are incident upon the first to tenth light receiving elements 35, 37, 43 to 57, and FIG. 5B shows the relation between the respective light receiving elements and the respective diffracted light spots when the diffracted lights r21, r22, r21', r22' having the second wavelength λ2 are incident upon the respective light receiving elements.

As shown in FIG. 5A, the first light receiving element 35 is divided into three light receiving areas 35a, 35b, 35c in the Y axis direction, and the second light receiving element 37 is similarly divided into light receiving areas 37a, 37b, 37c.

Moreover, the third light receiving element 43 is divided into light receiving areas 43a, 43b in the Y axis direction, and the fourth light receiving element 45, fifth light receiving element 47 and sixth light receiving element 49 are similarly divided into light receiving areas 45a, 45b, light receiving areas 47a, 47b and light receiving areas 49a, 49b, respectively.

Subsequently, a method of obtaining the focus error signal, tracking error signal, recording signal of the lights with the first and second wavelengths based on the outputs from the respective light receiving elements provided with the aforementioned constitution will next be described.

The method of obtaining the focus error signal, tracking error signal, and recording signal of the DVD luminous flux having the first wavelength (λ1=650 nm) will first be described with reference to FIG. 5A.

In FIG. 5A, crosshatch marks 59 on the light receiving element represent spots of the diffracted lights r11, r11' by the first diffraction area 29. Moreover, hatch marks 61 represent the spots of the diffracted lights r12, r12' by the second diffraction area 31.

As described above, when the lens power is applied to the first diffraction area 29 and second diffraction area 31, the +1st order diffracted light r11 from the first diffraction area 29 is given the concave lens power, and the +1st order diffracted light r12 from the second diffraction area 31 is given the convex lens power. Therefore, the crosshatch mark 59 represents the light spot of the concave lens power, and the hatch mark 61 represents the light spot of the convex lens power. Therefore, based on the outputs from the light receiving areas 35a to 35c of the light receiving element 35 and the outputs from the light receiving areas 37a to 37c of the light receiving element 37, the focus error signal of the DVD luminous flux having the first wavelength can be obtained.

More specifically, provided a sum of the outputs from the light receiving areas 35b, 37a, 37c is S1, and a sum of output signals from the light receiving areas 35a, 35c, 37b is S2, the focus error signal FE is given by:

$$FE=S1-S2.$$

On the other hand, the tracking error signal to the information recording medium 21 of the DVD luminous flux of the first wavelength can be computed/detected based on detection signals from the light receiving areas 43a, 43b, 45a, 45b having the spot marks 59, 61 of the diffracted lights r11', r12'. More specifically, provided the outputs of the light receiving areas 43a, 45a, 43b, 45b are D1, D2, D3, D4, these outputs constitute tracking error detection signals by a difference detection method (DPD).

Additionally, a recording signal RF of the information recording medium 21 is given by the sum of outputs from the first light receiving element 35, second light receiving element 37, third light receiving element 43, and fourth light receiving element 45. Specifically, the recording signal RF is given by:

$$RF=S1+S2+D1+D2+D3+D4.$$

The method of obtaining the focus error signal, tracking error signal, and recording signal of the CD luminous flux having the second wavelength (λ2=780 nm) will next be described with reference to FIG. 5B.

In FIG. 5B, the crosshatch marks 59 represent the spots of the diffracted lights r21, r21', and the hatch marks 61 represent the spots of the diffracted lights r22, r22'.

Similarly as the light of the first wavelength λ1, the focus error signal FE of the CD luminous flux having the second wavelength can be computed/detected based on the output signals from the light receiving areas 35a to 35c of the first light receiving element 35 and light receiving areas 37a to 37c of the second light receiving element 37. More specifically, when the sum of the output signals from the light receiving areas 35b, 37a, 37c is S1, and the sum of the output signals from the light receiving areas 35a, 35c, 37b is S2, the focus error signal FE of the CD light having the second wavelength λ2 is given by:

$$FE=S1-S2.$$

On the other hand, a tracking error signal TE of the CD luminous flux is detected by three beams by the 3-beam method. More specifically, provided the sum of outputs from the eighth and tenth light receiving elements 53, 57 is E, and the sum of outputs from the seventh and ninth light receiving elements 51, 55 is F, the 3-beam tracking error signal TE is given by:

$$TE=E-F.$$

Moreover, with the CD luminous flux, provided the sum of outputs of the light receiving areas 35b, 37a, 37c is S1, the sum of outputs of the light receiving areas 37b, 35a, 35c is S2, the sum of outputs of the light receiving area 47a of the fifth light receiving element 47 and the light receiving area 49a of the sixth light receiving element 49 is R1, and the sum of outputs of the light receiving area 47b of the fifth light receiving element 47 and the light receiving area 49b of the sixth light receiving element 49 is R2, the recording signal RF of the information recording medium 21 is given by:

$$RF=S1+S2+R1+R2.$$

Additionally, when recording is performed on a CD-R, it is known that offset is generated in the 3-beam method, and from necessity of detection of an address in pre-groove (ADIP) signal as address information, tracking error detection by a so-called push-pull method is desirable. Provided that the sum of outputs of the light receiving areas 47a, 49a is R1, and the sum of outputs of the light receiving areas 47b, 49b is R2, the tracking error signal can be obtained by:

$$TE(pp/CD-R)=R1-R2.$$

Therefore, according to the first embodiment, the outputs of the light receiving areas 35a, 35b, 35c of the first light receiving element 35 and the light receiving areas 37a, 37b, 37c of the second light receiving element 37 are used for detection of the focus error signal FE (and the recording signal RF) with respect to the light of either the first wavelength or the second wavelength.

Moreover, the outputs of the third light receiving element 43 and fourth light receiving element 45 are exclusively used for computation of the tracking error signal (and the recording signal RF) of the DVD luminous flux.

Furthermore, the outputs from the seventh, eighth, ninth, and tenth light receiving elements 51, 53, 55, 57 are used only for the computation of the 3-beam tracking error signal TE of the CD luminous flux.

Therefore, the first embodiment has the following advantages:

(1) For detection of the focus error signal, a signal system can be shared with respect to the DVD and CD luminous fluxes.

(2) The signal system for a detection processing of the focus error signal can completely be separated from the signal system for the detection processing of the tracking error signal, and therefore a structure of a signal processing system can be simplified.

(3) For the detection processing itself of the tracking error signal, the signal system for the DVD luminous flux can completely be separated from that for the CD luminous flux, and therefore the signal processing system can be simplified.

FIGS. 6A to 6C and 7A to 7C show reasons why the aforementioned conditions 1) and 2) are satisfied, then the diffracted lights r11, r21 of the first and second wavelengths by the first diffraction area 29 are converged to much the same first position P1 on the light receiving element substrate 39, and the diffracted lights r12, r22 of the first and second wavelengths by the second diffraction area 31 are converged to substantially the same second position P2 on the light receiving element substrate 39.

Figure 6A:
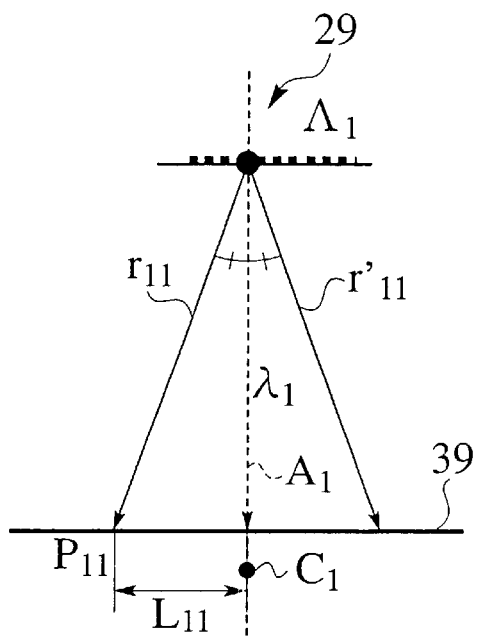
FIGS. 6A to 6C are explanatory views showing a manufacture method of the first embodiment.
Figure 6B:
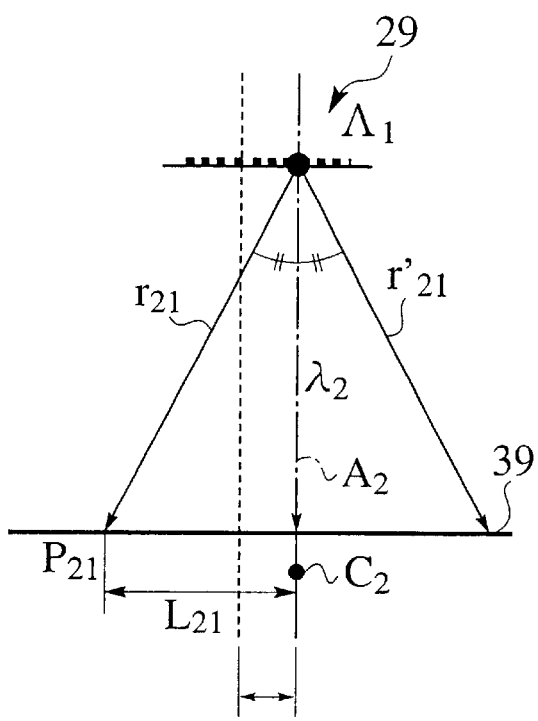

FIG. 6A shows the +1st order diffracted light r11 and −1st order diffracted light r11' diffracted by the first diffraction area 29 having the grating pitch Λ1 and provided with the first wavelength. FIG. 6B shows the +1st order diffracted light r21 and −1st order diffracted light r21' diffracted by the first diffraction area 29 and provided with the second wavelength.

Here, the grating pitch Λ1 is set to satisfy the aforementioned condition 1). Therefore, when the distance L11 between an incident position P11 of the +1st order diffracted light r11 of the first wavelength λ1 to the surface of the light receiving element substrate 39 and the optical axis A1 determined by the 0th order transmitted light of the first wavelength λ1 by the first diffraction area 29 is the first distance, and the distance L21 between an incident position P21 of the +1st order diffracted light r21 of the second wavelength λ2 to the surface of the light receiving element substrate 39 and the optical axis A2 determined by the 0th order transmitted light of the second wavelength λ2 by the same diffraction area is the second distance, the difference |L11−L21| between the first distance L11 and the second distance L21 becomes substantially equal to the interval d between the light emitting points of the first and second light sources.

Figure 6C:
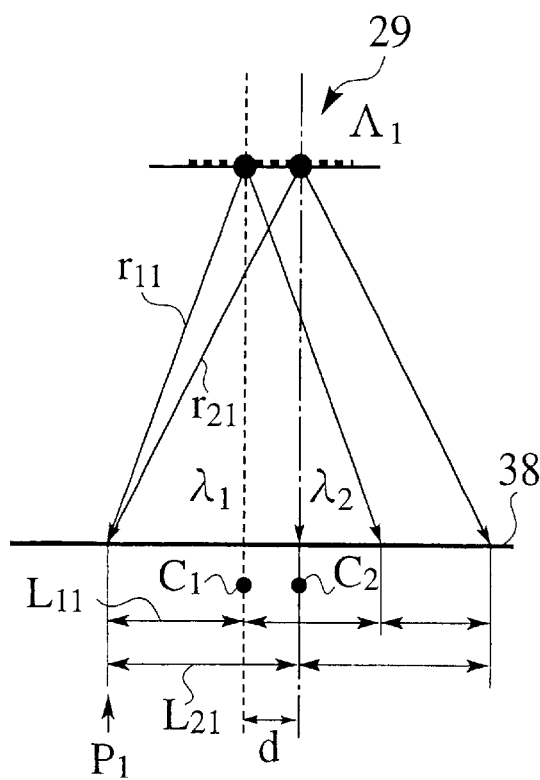

Therefore, as shown in FIG. 6C in which FIGS. 6A and 6B are superposed upon each other, the diffracted lights r11, r21 are converged to much the same first position P1 on the light receiving element substrate 39.

FIGS. 7A to 7C show not only that the diffracted lights r11, r21 are converged to much the same first position P1, but also that the diffracted lights r12, r22 by the second diffraction area 31 are also converged to substantially the same second position P2 on the light receiving element substrate 39.

More specifically, FIG. 7A shows the ±1st order diffracted lights r11, r11' of the first wavelength by the first diffraction area 29 having the grating pitch Λ1, and the ±1st order diffracted lights r12, r12' of the first wavelength Λ1 by the second diffraction area 31 having the grating pitch Λ2. FIG. 7B shows the ±1st order diffracted lights r21, r21' of the second wavelength by the first diffraction area 29 and the +1st order diffracted lights r22, r22' of the second wavelength by the second diffraction area 31.

Moreover, the grating pitches Λ1, Λ2 are set to satisfy the aforementioned condition 1). Therefore, when distances L11, L12 between the incident positions P11, P12 of the +1st order diffracted lights r11, r12 of the first wavelength λ1 to the light receiving element substrate 39 surface by the first diffraction area 29 and second diffraction area 31 and the optical axis A1 determined by the 0th order transmitted light of the first wavelength λ1 are first distances, and distances L21, L22 between the incident positions P21, P22 of the diffracted lights r21, r22 of the second wavelength λ2 to the light receiving element substrate 39 surface by the same diffraction area and the optical axis A2 determined by the 0th order transmitted light of the first wavelength λ2 are second distances, differences |L11−L21|, |L12−L22| between the first distance and the second distance is substantially equal to the interval d between the light emitting points of the first and second light sources.

Therefore, as shown in FIG. 7C in which FIGS. 7A and 7B are superposed upon each other, P11 becomes substantially equal to P21, and P12 becomes substantially equal to P22. In other words, the diffracted lights r11, r21 of the first and second wavelengths by the first diffraction area 29 are converged to much the same first position P1 on the light receiving element substrate 39, and the diffracted lights r12, r22 of the first and second wavelengths by the second diffraction area 31 are converged to substantially the same second position P2 on the light receiving element substrate 39.

Additionally, the interval S1 between the incident positions P11 and P12 of the +1st order diffracted lights r11 and r12 shown in FIG. 7A does not strictly or necessarily agree with the interval S2 between the incident positions P21 and P22 of the +1st order diffracted lights r21 and r22 shown in FIG. 7B and provided with the second wavelength λ2.

Therefore, the interval d between the first light source 25 and the second light source 27, and the grating pitches Λ1, Λ2 of the first diffraction area 29 and second diffraction area 31 have to be determined in such a manner that P11 and P21, or P12 and P22 agree with each other in the error range of a size of the first or second light receiving element 35, 37.

Figure 8:
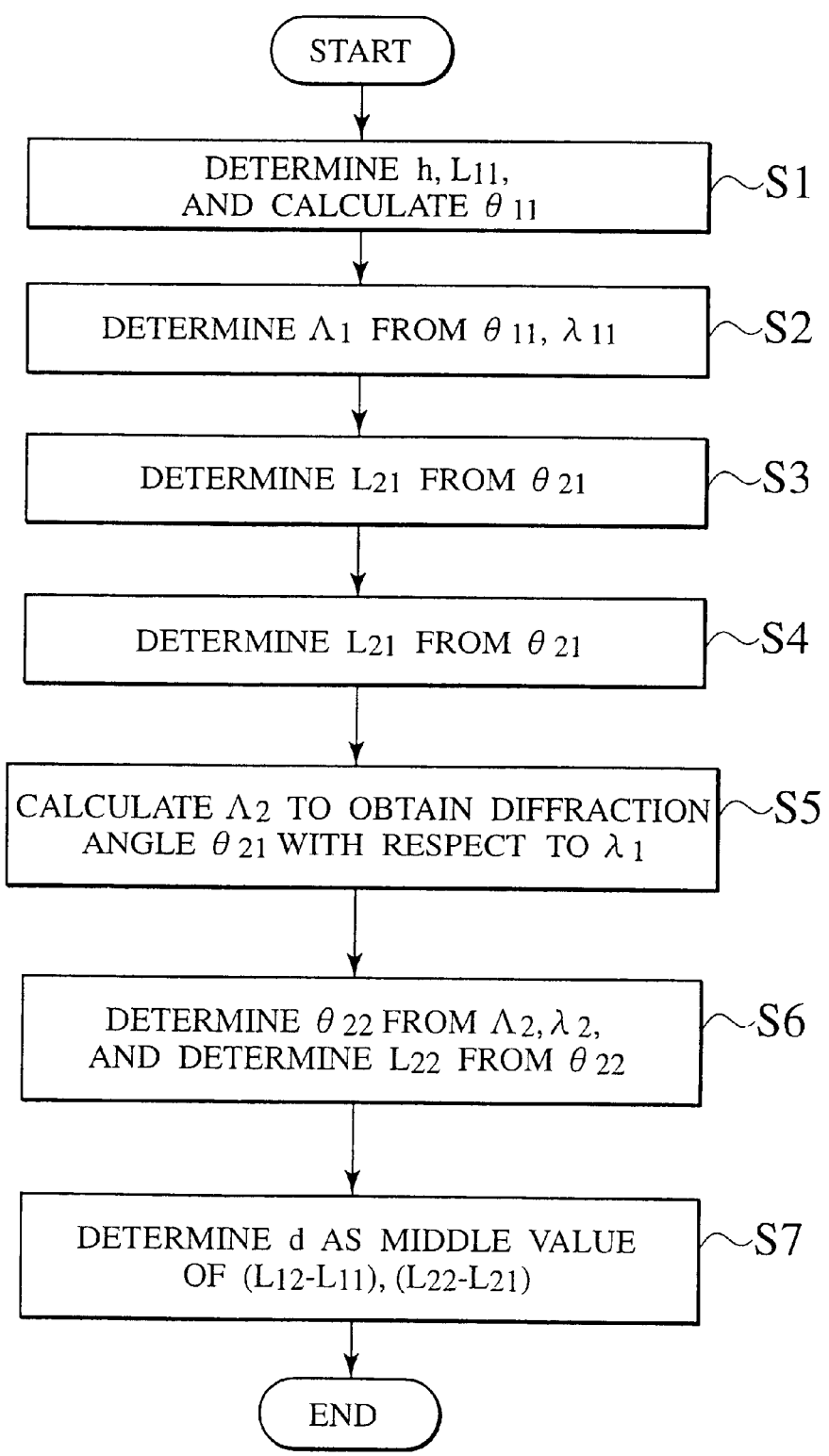
FIG. 8 is an explanatory view showing the manufacture method of the first embodiment.
Figure 9:
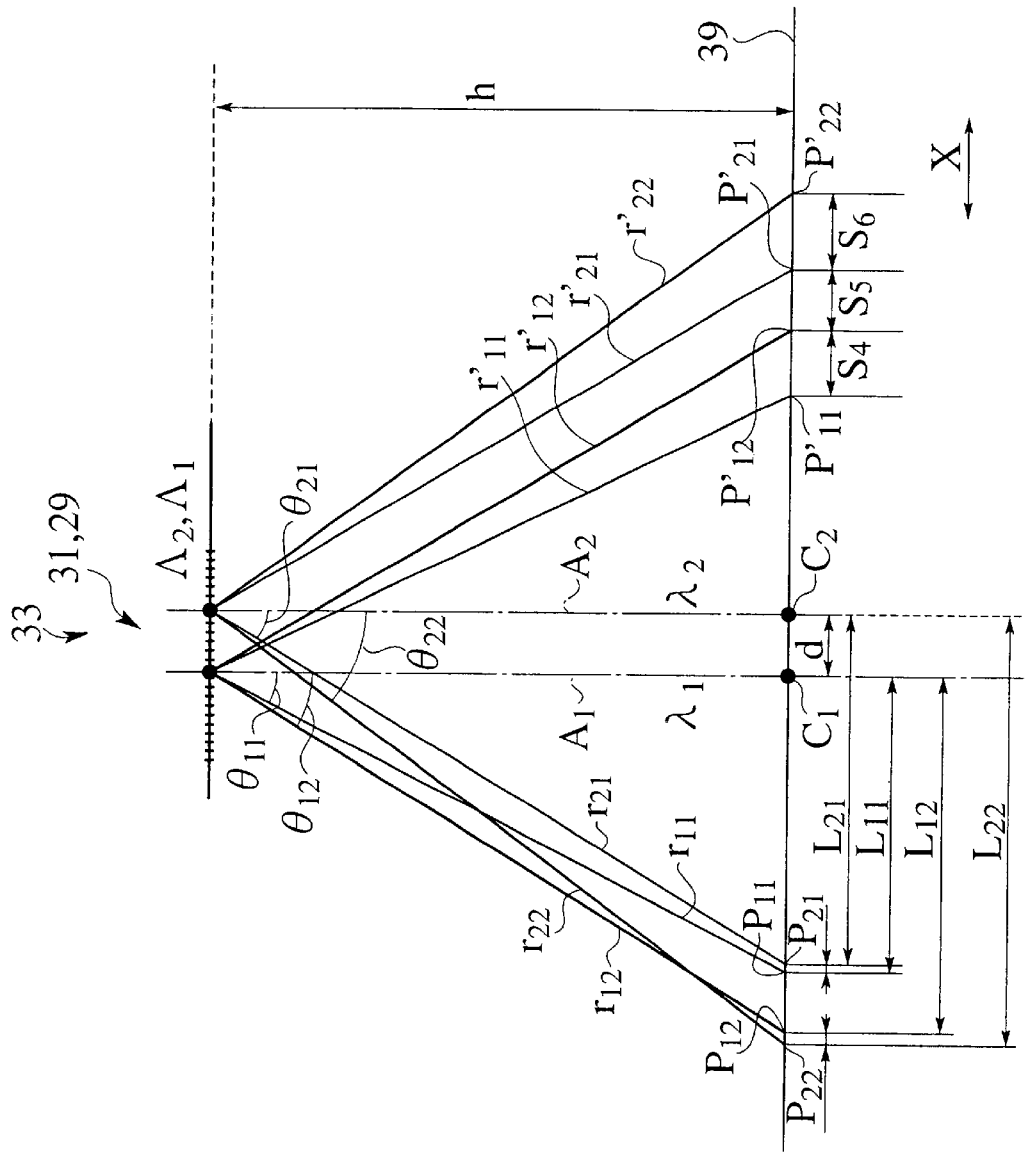
FIG. 9 is an explanatory view showing the manufacture method of the first embodiment.

FIGS. 8 and 9 show a method of determining the grating pitches Λ1, Λ2 and the interval d between the first and second light sources 25, 27.

Referring to FIGS. 8 and 9, in step S1, the interval h between the light receiving element substrate 39 and the holographic optical element 33 is determined.

Moreover, the interval L11 between the optical axis A1 and the incident position P11 of the diffracted light r11 is determined. Furthermore, a diffraction angle θ11 of the diffracted light r11 is determined based on these values h and L11.

In step S2, based on the diffraction angle θ11 obtained in the step S1 and the value of the first wavelength λ1, the grating pitch Λ1 is determined by diffraction formula.

In step S3, based on the grating pitch Λ1 of the first diffraction area 29 and the value of the second wavelength λ2, a diffraction angle θ21 of the diffracted light r21 is determined.

In step S4, based on the diffraction angle θ21 obtained in the step S3 and the interval h, the incident position P21 of the diffracted light r21, and the interval L21 between the position P21 and the optical axis A2 are determined.

In step S5, the grating pitch Λ2 is determined in such a manner that a diffraction angle θ12 of the diffracted light r12 becomes equal to the diffraction angle θ21 of the diffracted light r21.

In step S6, based on the grating pitch Λ2 and the value of the second wavelength λ2, by the diffraction formula, a diffraction angle θ22 of the diffracted light r22 is determined. Moreover, from the diffraction angle θ22, the incident position P22 of the diffracted light r22, and the interval L22 between the position P22 and the optical axis A2 are determined.

In step S7, d is determined as a middle value of L12–L11 (=S1) and L22–L21 (=S2).

The grating pitches Λ1, Λ2 and the interval d between the first and second light sources 25, 27 determined by the aforementioned method are as follows. For example, when the interval h between the light receiving element substrate 39 and the holographic optical element 33 is 3000 μm, and the interval L11 is 500 μm, the grating pitch Λ1 of the first diffraction area 29 is determined as about 4.0 μm, the grating pitch Λ2 of the second diffraction area 31 is determined as about 3.3 μm, and the interval d between the light emitting points of the light sources is determined as about 120 μm.

Additionally, in this case, the interval between the incident positions P11 and P21 is about 11 μm, and the interval between the incident positions P21 and P22 is about 12 μm. Moreover, intervals s4, s5, s6 of incident points P11', P12', P21', P22' of the −1st order diffracted lights r11', r12', r21', r22' to the light receiving element substrate 39 are about 104 μm, 120 μm, 130 μm, respectively.

Therefore, according to the aforementioned method, the grating pitches Λ1, Λ2 and the interval d between the first and second light sources 25, 27 are determined in such a manner that the +1st order diffracted lights r11, r21 by the first diffraction area 29 are both converged to substantially the same position on the light receiving element substrate 39 in the error range of about 10 μm, and the +1st order diffracted lights r12, r22 are also converged to substantially the same position on the light receiving element substrate 39 in the error range of about 10 μm.

<Second Embodiment>

Figure 10:
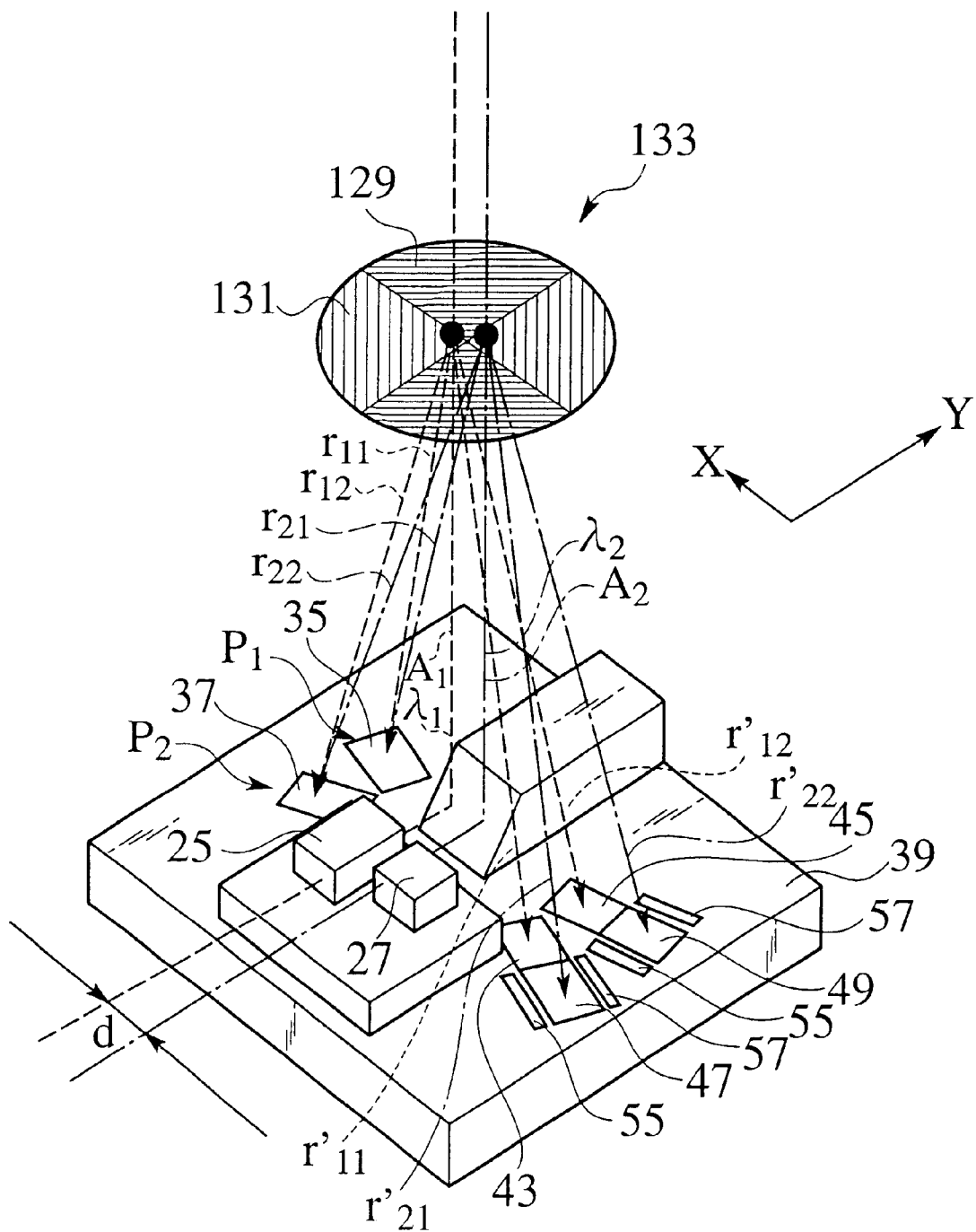
FIG. 10 is a schematic perspective view of a second embodiment of the optical device of the present invention.
Figure 11:
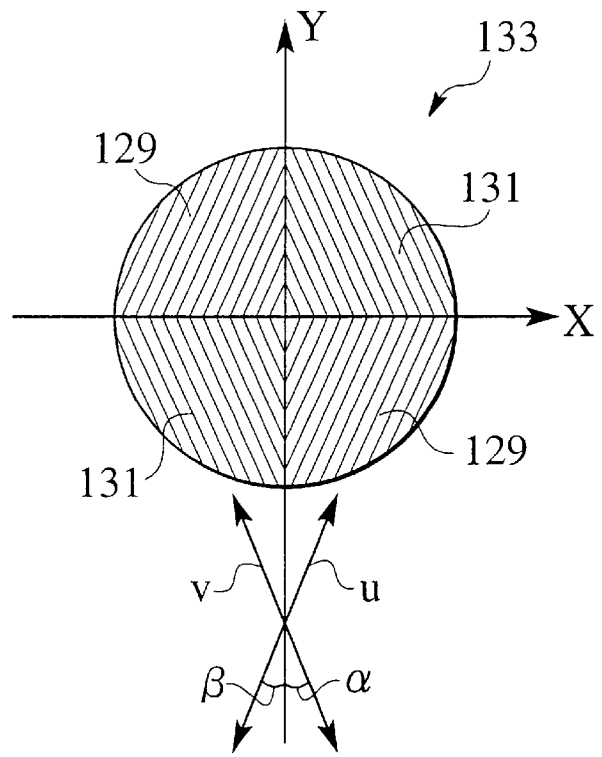
FIG. 11 is a schematic view of the holographic optical element in the second embodiment.
Figure 12:
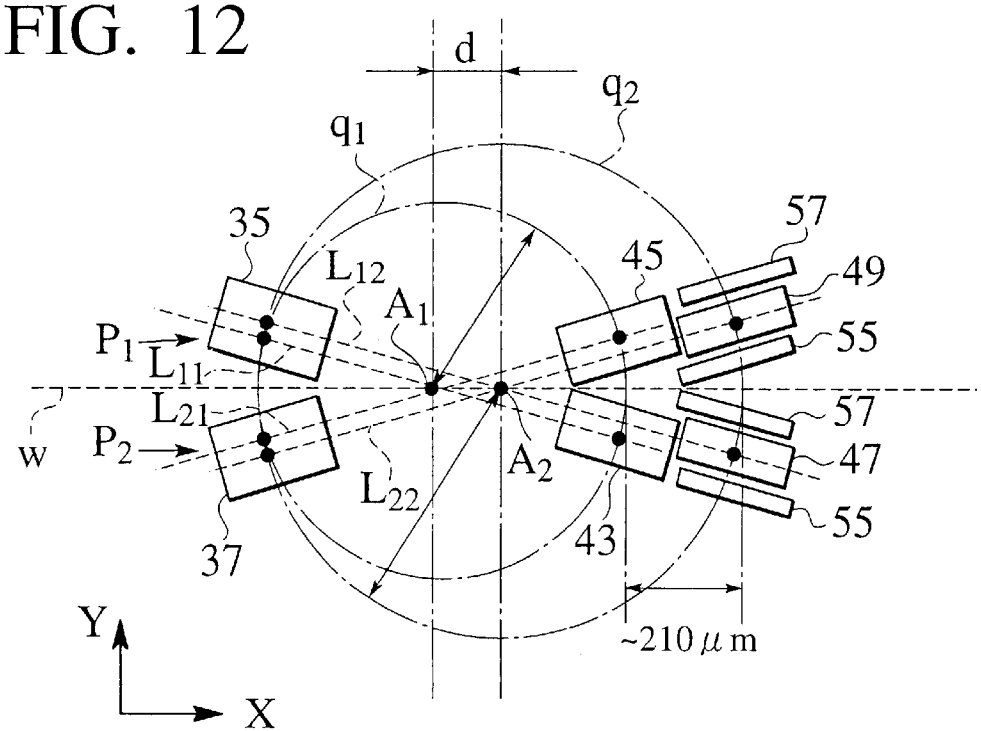
FIG. 12 is an explanatory plan view showing positions of two light sources and light receiving element in the second embodiment.

FIGS. 10 to 12 show a second embodiment of the optical device of the present invention.

As best shown in FIG. 12, the first and second light receiving elements 35, 37 are positioned on both sides of an axis w connecting the optical axis A1 to A2 in substantially the same position in the X axis direction.

Also in predetermined positions of the light receiving element substrate 39, the third to sixth light receiving elements 43 to 49 and ninth and tenth light receiving elements 55, 57 are disposed. Here, the third and fourth light receiving elements 43, 45 receive the −1st order diffracted lights r11', r12' having the first wavelength from diffraction areas 129, 131. Moreover, the fifth and sixth light receiving elements 47, 49 receive the −1st order diffracted lights r21', r22' having the second wavelength from the diffraction areas 129, 131. Furthermore, the ninth and tenth light receiving elements 55, 57 receive three beams for CD.

Y axis direction dimensions of these elements 55, 57 are determined (e.g., about 90 μm) in such a manner that an incident luminous flux diameter (e.g., about 80 μm) is covered, and inclination angles are determined in such a manner that the elements fail to overlap with each other in the vicinity of the X axis. Here, the inclination angle is determined by inclination angles α, β of a hologram diffraction axis, and an equal angle may be set with respect to the light receiving element, and design is actually possible, for example, at about α=β=10°.

The third and fourth light receiving elements 43, 45 are apart from each other by the predetermined distance in the Y axis direction in substantially the same position in the X axis direction, and disposed on both sides of the axis w. Moreover, the fifth and sixth light receiving elements 47, 49 are also apart from each other by the predetermined distance in the Y axis direction in substantially the same position in the X axis direction, and disposed on both sides of the axis w. Here, the interval between the fifth and sixth light receiving elements 47, 49 is larger than the interval between the third and fourth light receiving elements 43, 45. Moreover, the ninth and tenth light receiving elements 55, 57 are disposed on both sides of the fifth and sixth light receiving elements 47, 49, respectively. Specifically, the ninth and tenth light receiving elements 55, 57 are aligned with the light receiving elements 47, 49 in the Y axis direction.

The light receiving elements 43, 45, and 47, 49 are disposed apart from each other in the X axis direction, and the interval is, for example, about 210 μm.

More specifically, the second embodiment of the optical device has the following constitution.

Specifically, as shown in FIGS. 10 to 12, the optical device is provided with the first light source 25 for outputting the light of the first wavelength λ1, and the second light source 27 for outputting the light of the second wavelength λ2. Here, the first wavelength λ1 is, for example, 650 nm for a DVD, and the second wavelength λ2 is, for example, 780 nm for a CD. The interval d between the light emitting points of the light sources 25, 27 is set, for example, to about 104 μm.

Moreover, directions of grating axes u, v of the respective diffraction areas 129, 131 have angles α, β with respect to the Y axis. The angles α, β are set, for example, to a value of the order of 8.6 degrees. In this case, the grating axes u, v of the diffraction areas 129, 131 have an angle of about 17.2 degrees with each other. The grating pitches Λ of the first and second diffraction areas 129 and 131 of the holographic optical element 133 are both set to about 4.0 μm.

Additionally, the interval between the light receiving element substrate 39 and the holographic optical element 133 is set, for example, to 3000 μm similarly as the first embodiment.

By the aforementioned constitution, the DVD luminous flux emitted from the first light source 25 and provided with the first wavelength is reflected by the information recording medium (not shown), and subsequently diffracted by the first diffraction area 129 and second diffraction area 131 to produce ±1st order diffracted lights r11, r12, r11', r12'. Subsequently, the +1st order diffracted light r11 by the first diffraction area 129 is converged to the first light receiving element 35, and the +1st order diffracted light r12 by the second diffraction area 131 is converged to the second light receiving element 37. On the other hand, the −1st order diffracted lights r11', r12' by the first diffraction area 129 and second diffraction area 131 are converged to the third light receiving element 43 and fourth light receiving element 45, respectively.

Moreover, the CD luminous flux provided with the second wavelength from the second light source 27 is reflected by the information recording medium (not shown), then diffracted by the first and second diffraction areas 129, 131 to produce the ±1st order diffracted lights r21, r22, r21', r22'. Subsequently, the +1st order diffracted light r21 by the first diffraction area 129 is converged to the first light receiving element 35, and the +1st order diffracted light r22 by the second diffraction area 131 is converged to the second light receiving element 37. On the other hand, the −1st order diffracted lights r21', r22' by the first diffraction area 129 and second diffraction area 131 are converged to the fifth light receiving element 47 and sixth light receiving element 49, respectively.

In the design for applying the lens power to the first diffraction area 129 and second diffraction area 131, the concave lens action is applied to the diffracted lights r11, r21, and the convex lens action is applied to the diffracted lights r12, r22. Therefore, similarly as the first embodiment, the focus error signal by the complementary spot size method can be obtained on the basis of the outputs from the first light receiving element 35 and second light receiving element 37.

Moreover, as described later, similarly as the first embodiment, based on the outputs from the third light receiving element 43 and fourth light receiving element 45, the tracking error signal of the DVD luminous flux having the first wavelength can be obtained.

Furthermore, based on the output signals from the fifth and sixth light receiving elements 47, 49, the tracking error signal of the CD-R luminous flux having the second wavelength can be obtained.

As not shown, also in the second embodiment of the optical device, in order to detect the tracking error of the CD luminous flux (second wavelength λ2) by the 3-beam method, the 3-beam generating diffraction grating (not shown) is disposed between the second light source 27 and the information recording medium. The 3-beam generating diffraction grating (not shown) is formed, for example, on the surface opposite to the surface provided with the holographic optical element 133 in the diffraction element substrate (not shown) provided with the holographic optical element 133.

Moreover, for the tracking error detection by the 3-beam method, the ninth and tenth light receiving elements 55, 57 are disposed on both sides of the fifth and sixth light receiving elements 47, 49, respectively.

By the aforementioned constitution, the CD luminous flux emitted from the second light source 27 is branched to three luminous fluxes aligned in a tangential direction (Y axis direction) of the information recording medium by the 3-beam generating diffraction grating (not shown). The three luminous fluxes are reflected by the information recording medium 21, then diffracted by the first and second diffraction areas 129, 131, diffracted with the same diffraction angle as that of the diffracted lights r21', r22', and converged onto the light receiving elements 55, 47, 57 or the light receiving elements 55, 49, 57 aligned in the Y axis direction on the light receiving element substrate 39. Therefore, for example, based on the outputs from the light receiving elements 55, 57, the tracking error signal of the CD luminous flux by the 3-beam method can be obtained.

FIGS. 13A and 13B show the detailed constitution of the first to sixth light receiving elements 35, 37, 43, 45, 47, 49 and the ninth and tenth light receiving elements 55, 57. More specifically, FIG. 13A shows a case in which the DVD luminous flux is incident upon the light receiving element, and a hatch mark 201 represents the spot of the DVD luminous flux on the light receiving element. Moreover, FIG. 13B shows a case in which the CD luminous flux is incident upon the light receiving element, and a hatch mark 203 represents the spot of the CD luminous flux on the light receiving element.

As shown in FIGS. 13A and 13B, similarly as the first embodiment, the first light receiving element 35 and second light receiving element 37 are divided into three light receiving areas 35a, 35b, 35c and light receiving areas 37a, 37b, 37c substantially along the Y axis direction.

Moreover, the third, fourth, fifth, sixth light receiving elements 43, 45, 47, 49 are divided into two light receiving areas 43a, 43b; 45a, 45b; 47a, 47b; 49a, 49b substantially along the Y axis direction, respectively.

By the aforementioned constitution, based on the outputs from the light receiving areas 35a, 35b, 35c and the outputs from the light receiving areas 37a, 37b, 37c, the focus error signals of the DVD luminous flux of the first wavelength λ1 and the CD luminous flux of the second wavelength λ2 can be obtained.

More specifically, when the sum of outputs from the light receiving areas 35b, 37a, 37c is S1, and the sum of outputs from the light receiving areas 35a, 35c, 37b is S2, the focus error signal FE is given by:

$FE=S1-S2.$

Moreover the tracking error signal of the DVD luminous flux is, similarly as the first embodiment, given by outputs D1, D3 from the light receiving areas 43a, 43b of the third light receiving element 43 and outputs D2, D4 from the light receiving areas 45a, 45b of the fourth light receiving element 45.

Furthermore, when the output from the ninth light receiving element 55 is E, and the output of the tenth light receiving element 57 is F, the tracking error signal TE of the CD luminous flux is given by:

$TE=E-F.$

Additionally, in the case of a CD-R, when the sum of outputs of the light receiving areas 47a, 49a is R1, and the sum of outputs of the light receiving areas 47b, 49b is R2, the tracking error signal is obtained by:

$TE(pp/CD-R)=R1-R2.$

Moreover, the recording signal RF of the DVD luminous flux is represented by:

$RF=S1+S2+D1+D2+D3+D4.$

Furthermore, when the sum of outputs of the light receiving area 47a of the fifth light receiving element 47 and the light receiving area 49a of the sixth light receiving element 49 is R1, and the sum of outputs of the light receiving area 47b of the fifth light receiving element 47 and the light receiving area 49b of the sixth light receiving element 49 is R2, the recording signal RF of the CD luminous flux is represented by:

$RF=S1+S2+R1+R2.$

Therefore, similarly as the first embodiment, the second embodiment is provided with the following advantages.

(1) For the detection of the focus error signal, the signal system can be shared with respect to the DVD and CD luminous fluxes.

(2) The signal system for the detection processing of the focus error signal can completely be separated from the signal system for the detection processing of the tracking error signal, and therefore the structure of the signal processing system can be simplified.

(3) For the detection processing itself of the tracking error signal, the signal system for the DVD luminous flux can completely be separated from that for the CD luminous flux, and therefore the signal processing system can be simplified.

In the optical device of the second embodiment, the arrangement positions of the first and second light sources 25, 27, the grating axis directions u, v of the first and second diffraction areas 129, 131, and the positions of the first and second light receiving elements 35, 37 are determined, for example, as follows.

As shown in FIG. 12, first, when the DVD luminous flux emitted from the optical axis A1 and provided with the first wavelength λ1 is diffracted by a virtual diffraction grating provided with the same grating pitch as that of the first and second diffraction areas and directed in an arbitrary direction, a circle drawn by a resulting virtual diffracted light on the light receiving element substrate 39 (hereinafter referred to the diffraction circle) is q1. Similarly, when the CD luminous flux emitted from the optical axis A2 and provided with the second wavelength λ2 is diffracted by the virtual diffraction grating provided with the same grating pitch as that of the first and second diffraction areas and directed in the arbitrary direction, the diffraction circle drawn by the resulting virtual diffracted light on the light receiving element substrate 39 is q2.

Subsequently, the interval d between the optical axes A1 and A2 is determined in such a manner that the diffraction circle q1 contacts the diffraction circle q2.

Moreover, as shown in FIG. 12, the positions P1, P2 in the vicinity of a point at which the diffraction circles q1 and q2 contact each other are the arrangement positions of the first light receiving element 35 and second light receiving element 37. Additionally, the positions P1, P2 of the light receiving elements 35, 37 may be any positions as long as the interval between the diffraction circles q1 and q2 is 50 μm or less (preferably, 20 μm or less).

Subsequently, the grating axis directions u, v of the first and second diffraction areas 129, 131 are determined in such a manner that the diffracted lights r11, r21, r12, r22 of the first and second wavelengths by the diffraction areas 129, 131 are converged onto the light receiving elements 35, 37.

As described above, by determining the arrangement positions of the first and second light sources 25, 27, the positions of the first and second light receiving elements 35, 37, and the grating axis directions u, v of the first and second diffraction areas 129, 131, it is possible to converge both the +1st order diffracted lights r11, r21 of the first and second wavelengths by the first diffraction area 129 onto the light receiving element 35, and to converge both the +1st order diffracted lights r12, r22 of the first and second wavelengths by the second diffraction area 131 onto the light receiving element 37.

As described above, according to the first and second embodiments, the complementary focus error detection can be realized by a 2-wavelength optical system with respect to the two wavelengths. Therefore, in a DVD and CD-R compatible pickup or a reproduction apparatus, miniaturization, simplification, cost reduction, and high efficiency can be realized.

<Third Embodiment>

Figure 14:
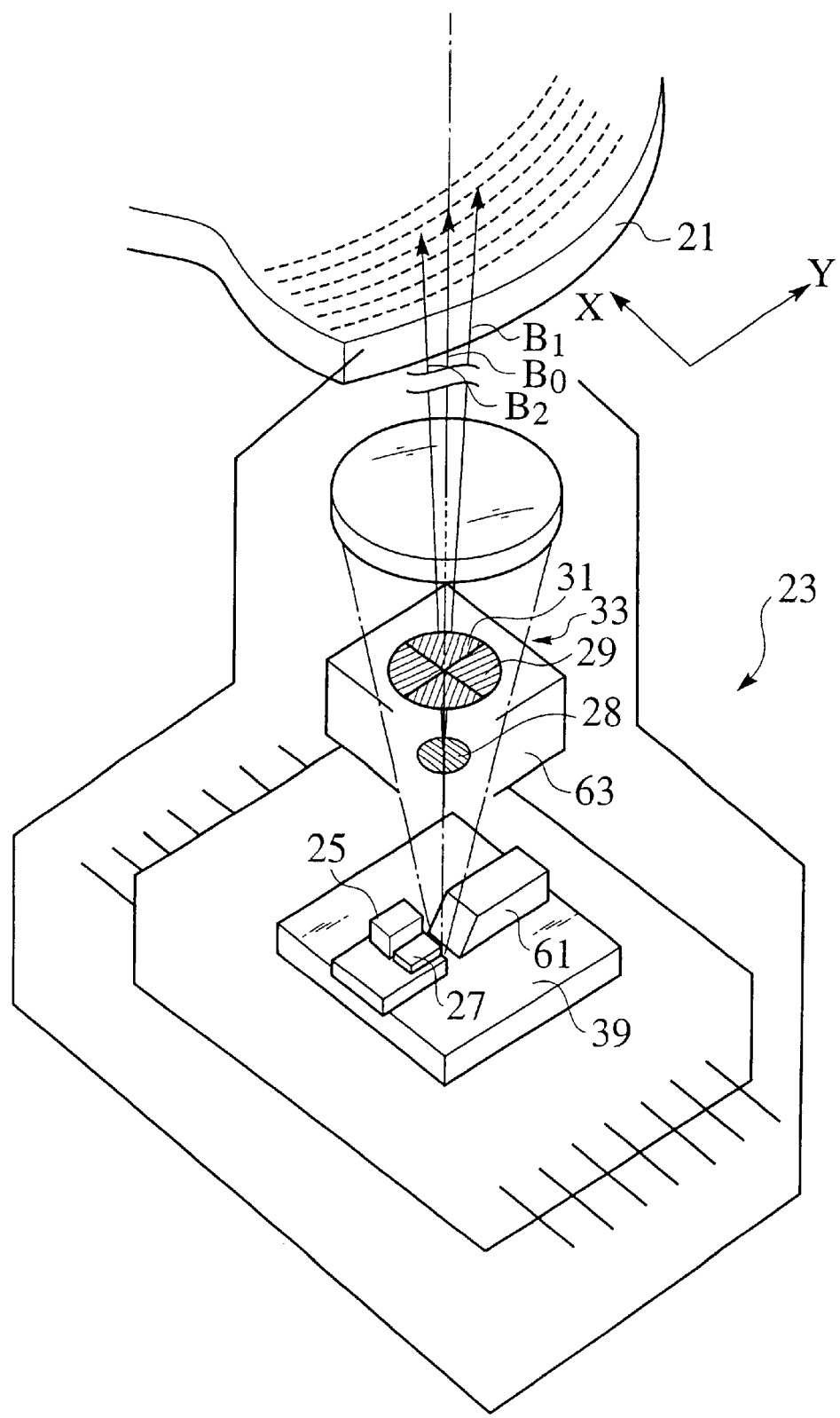
FIG. 14 is a schematic perspective view of a third embodiment of the optical device of the present invention.
Figure 15:
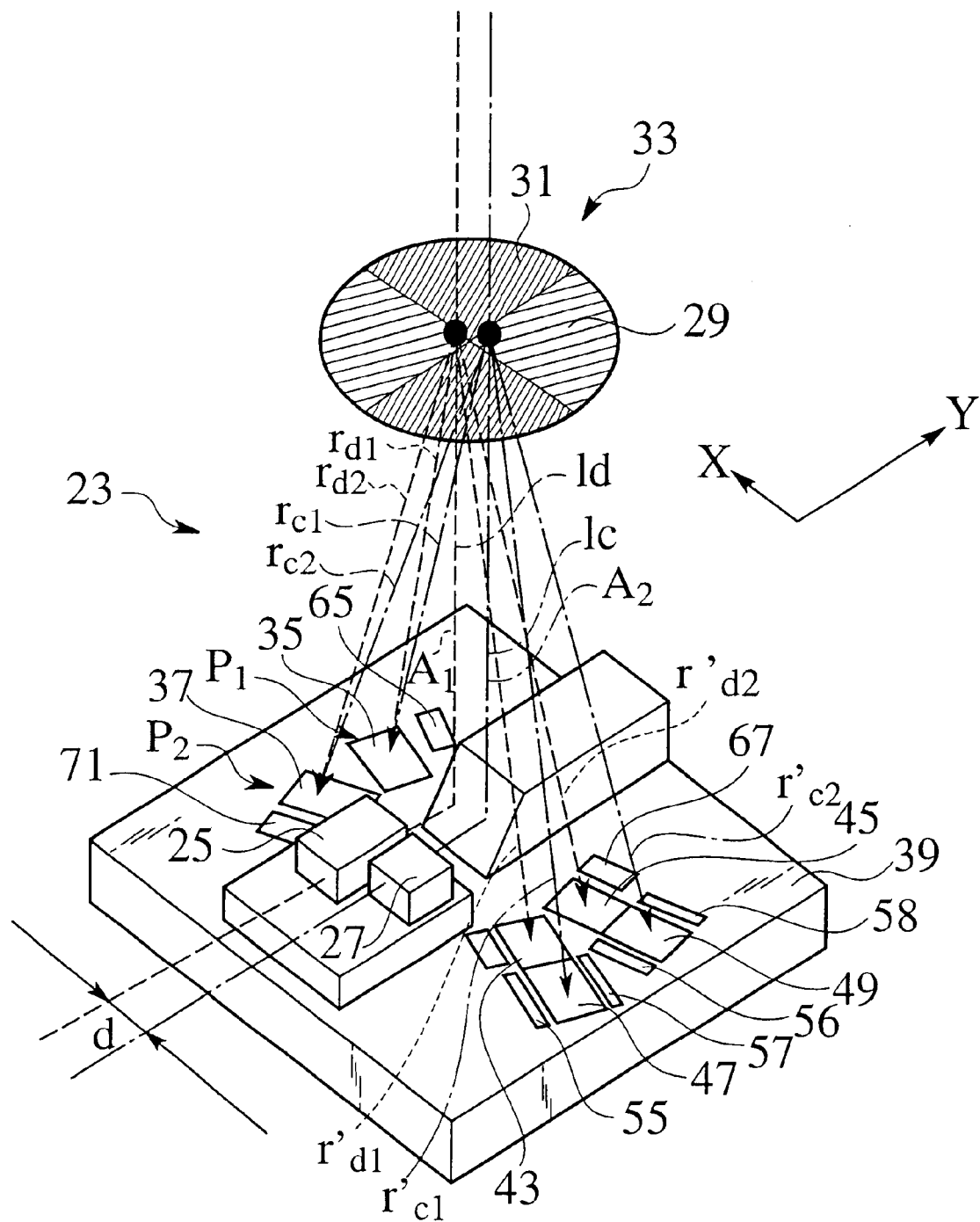
FIG. 15 is a schematic perspective view of the third embodiment of the optical device of the present invention.
Figure 16:
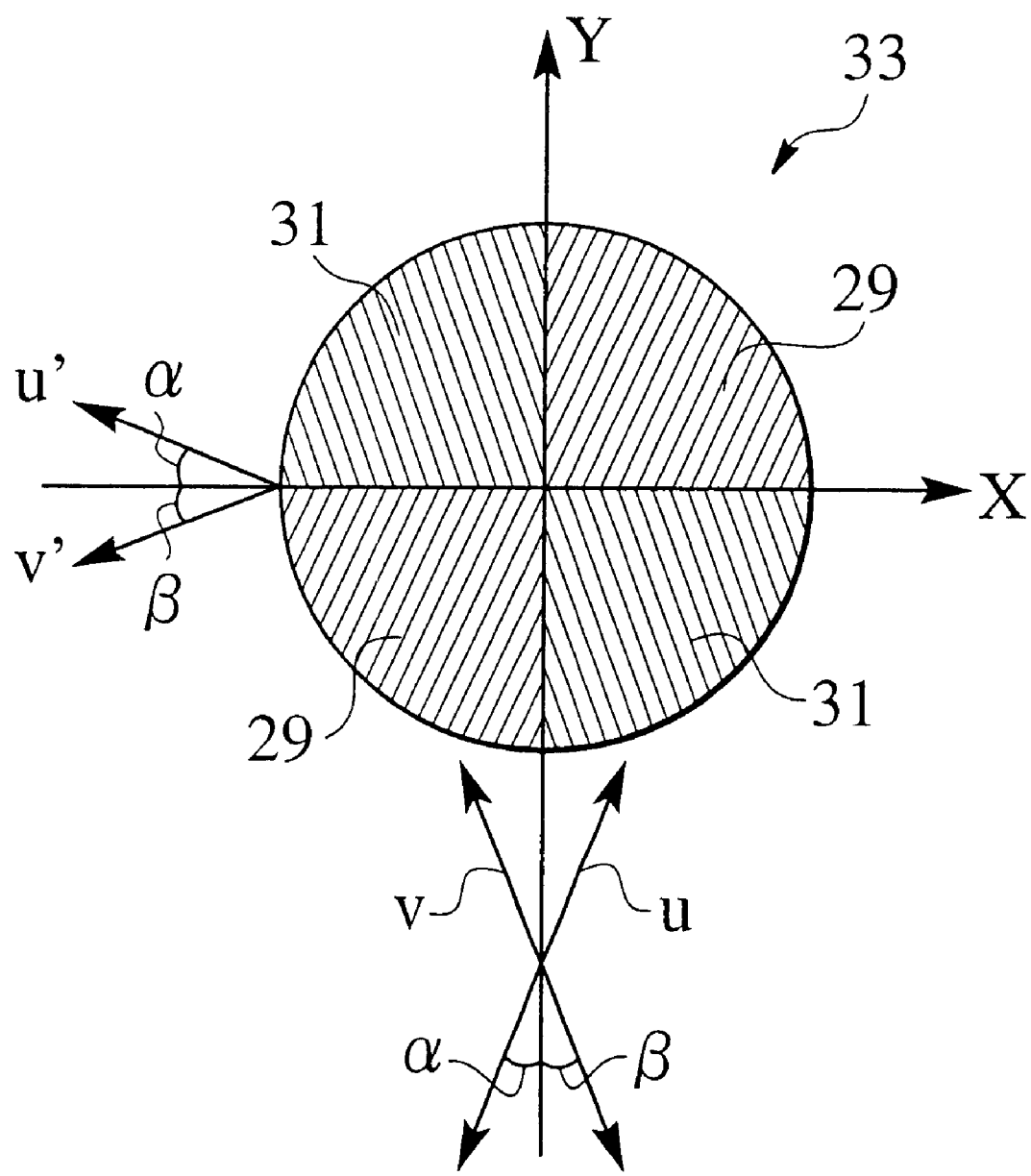
FIG. 16 is a schematic view of the holographic optical element in the third embodiment.

FIGS. 14 to 16 show a third embodiment of the optical device of the present invention.

In the third embodiment, similarly as the second embodiment, as shown in FIG. 14, disposed on the light receiving element substrate 39 are the first laser light source 25 for generating a DVD laser light 1d and the second laser light source 27 for generating a CD laser light 1c. The light emitting points of the first and second light sources 25, 27 are apart from each other by the predetermined distance d in the X axis direction as the radial direction of the recording medium 21. The interval d is, for example, about 104 μm.

The light receiving element substrate 39 is also provided with a reflection mirror 61 for reflecting the DVD laser light 1d and CD laser light 1c from the first laser light source 25 and second laser light source 27 toward the recording medium 21.

Moreover, a 3-beam generating diffraction grating 28 for branching beams 1d, 1c from the reflection mirror 61 into a main beam B0, and side beams B1, B2, and the holographic optical element 33 for directing the reflected beam from the recording medium 21 to the light receiving element substrate 39 are disposed on lower and upper surfaces of a diffraction element substrate 63 disposed between the reflection mirror 61 and the recording medium 21.

The grating pitch of the 3-beam generating diffraction grating 28 and the grating pitch and grating arrangement angle of the first and second areas 29, 31 of the holographic optical element are set as follows.

First, as shown in FIGS. 14, 15, 16, the holographic optical element first and second areas 29 and 31 are constituted by the diffraction areas provided with the grating axes whose directions u, v form angles α, β with respect to the Y axis as a track tangential direction of the recording medium 21. In other words, the areas are formed in such a manner that a diffraction axis direction u' of the ±1st order diffracted light by the first area 29, and a diffraction axis direction v' of the ±1st order diffracted light by the second area 31 form the predetermined angles α, β in opposite directions with respect to a radial axis X crossing at right angles of the track of the information recording medium 21. Here, preferably the grating pitches of the areas 29, 31 are the same and the angle a is equal to β.

The grating pitch of the holographic optical element first area 29 is determined in such a manner that substantially the same position P1 on the light receiving element substrate 39 (FIG. 15) is irradiated with +1st order diffracted lights rd1, rc1 (FIG. 15) of the main beam B0 of the DVD laser light 1d and CD laser light 1c by the area 29. Similarly, the grating pitch of the holographic optical element second area 31 is determined in such a manner that substantially the same position P2 on the light receiving element substrate 39 (FIG. 15) is irradiated with +1st order diffracted lights rd2, rc2 of the main beam B0 of the DVD laser light 1d and CD laser light 1c by the area 31.

Figure 17:
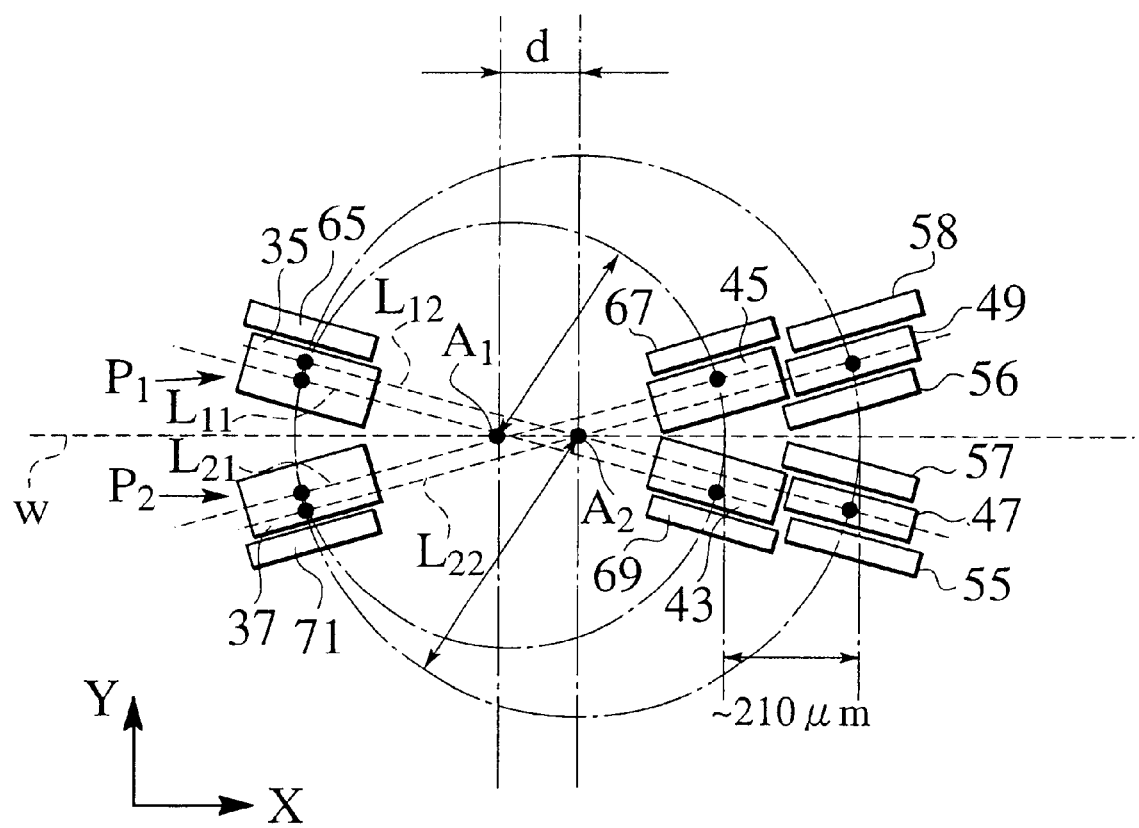
FIG. 17 is an explanatory plan view showing the positions of two light sources and light receiving element in the third embodiment.

First, with respect to the DVD laser light 1d, it is assumed that the +1st order diffracted light of the beam B0 by the first area 29 is rd1, and the distance L11 between the incident position P1 of the diffracted light rd1 onto the light receiving element substrate 39 and the optical axis A1 determined by the 0th order transmitted light is the first distance (FIG. 17). Moreover, with respect to the CD laser light 1c, it is assumed that the +1st order diffracted light of the beam B0 by the first diffraction area 29 is rc1, and the distance L12 between the incident position P1 of the diffracted light rc1 onto the light receiving element substrate 39 and the optical axis A2 determined by the 0th order transmitted light is the second distance. Subsequently, the difference |L11−L12| between the distances L11 and L12 is determined to be equal to the interval d between the light emitting points of the light sources 25, 27. This also applies to the second area 31, and thus the difference between L22 (distance between the position P2 and the optical axis A2) and L21 (distance between the position P2 and the optical axis A1) is determined to be substantially equal to the interval d. The grating pitch is set, for example, to about 4.0 μm.

Moreover, the angles of the grating axes u, v of the first and second areas 29, 31 are determined in such a manner that the +1st order diffracted light of the beam B0 of the DVD and CD laser lights by the second area 31 is converged substantially to the second position P2 apart from the first position P1 on the light receiving element substrate 39 in the Y axis direction by a sufficient distance for disposing the light receiving elements 35, 37. This angle α=β is set, for example, to about 8.6°.

By the aforementioned constitution, with respect to both the DVD laser light and the CD laser light, the position P1 is irradiated with the +1st order diffracted light of the main beam B0 by the first area 29 on the light receiving element substrate 39. Moreover, the position P2 is irradiated with the +1st order diffracted light of the main beam B0 by the second area 31 on the light receiving element substrate 39, with respect to both the DVD laser light and the CD laser light (see FIGS. 15 and 17).

The grating pitch of the 3-beam generating diffraction grating 28 is determined in accordance with an open angle of the hologram grating axes u, v as follows.

Specifically, when one of the ±1st order diffracted lights branched by the 3-beam generating diffraction grating is the first side beam B1 and the other is the second side beam B2, with respect to the DVD laser light, the +1st order diffracted light of the second side beam B2 by the hologram first area 29 is determined to be overlapped with the +1st order diffracted light of the first side beam B1 by the second area 31 on the light receiving element substrate. As described later, in this case, with respect to the DVD laser light, the −1st order diffracted light of the first side beam B1 by the hologram first area 29 is overlapped with the −1st order diffracted light of the second side beam B2 by the second area 31.

As shown in FIGS. 15 and 17, disposed in the position P1 on the light receiving element substrate 39 is the first light receiving element 35 for receiving the +1st order diffracted lights rd1, rc1 of the main beam in the DVD laser light (hereinafter referred to as the DVD main beam) and the main beam in the CD laser light (hereinafter referred to as the CD main beam) by the first area 29. Moreover, disposed in the position P2 on the light receiving element substrate 39 is the second light receiving element 37 for receiving the +1st order diffracted lights rd2, rc2 of the DVD main beam and the CD main beam by the second area 31.

The third and fourth light receiving elements 43 and 45 for receiving the −1st order diffracted lights rd1' and rd2' of the DVD main beam B0 by the first and second areas 29 and 31 are disposed on the light receiving element substrate 39.

Similarly, the fifth and sixth light receiving elements 47 and 49 for receiving the −1st order diffracted lights rc1' and rc2' of the CD main beam B0 by the first and second areas 29 and 31 are disposed.

Figure 18:
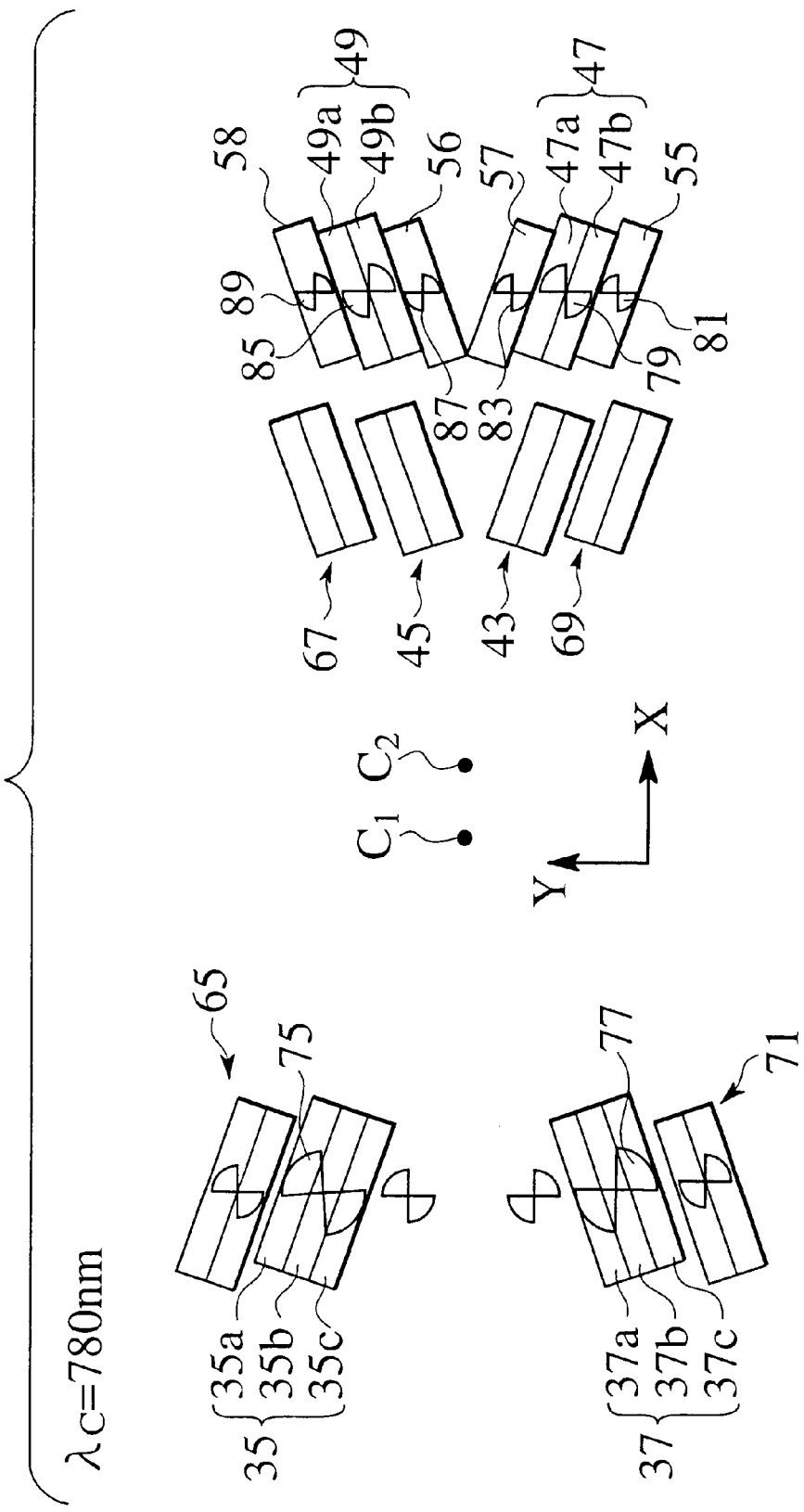
FIG. 18 is an explanatory view showing a spot of a CD laser light incident upon the light receiving element in the third embodiment.
Figure 19:
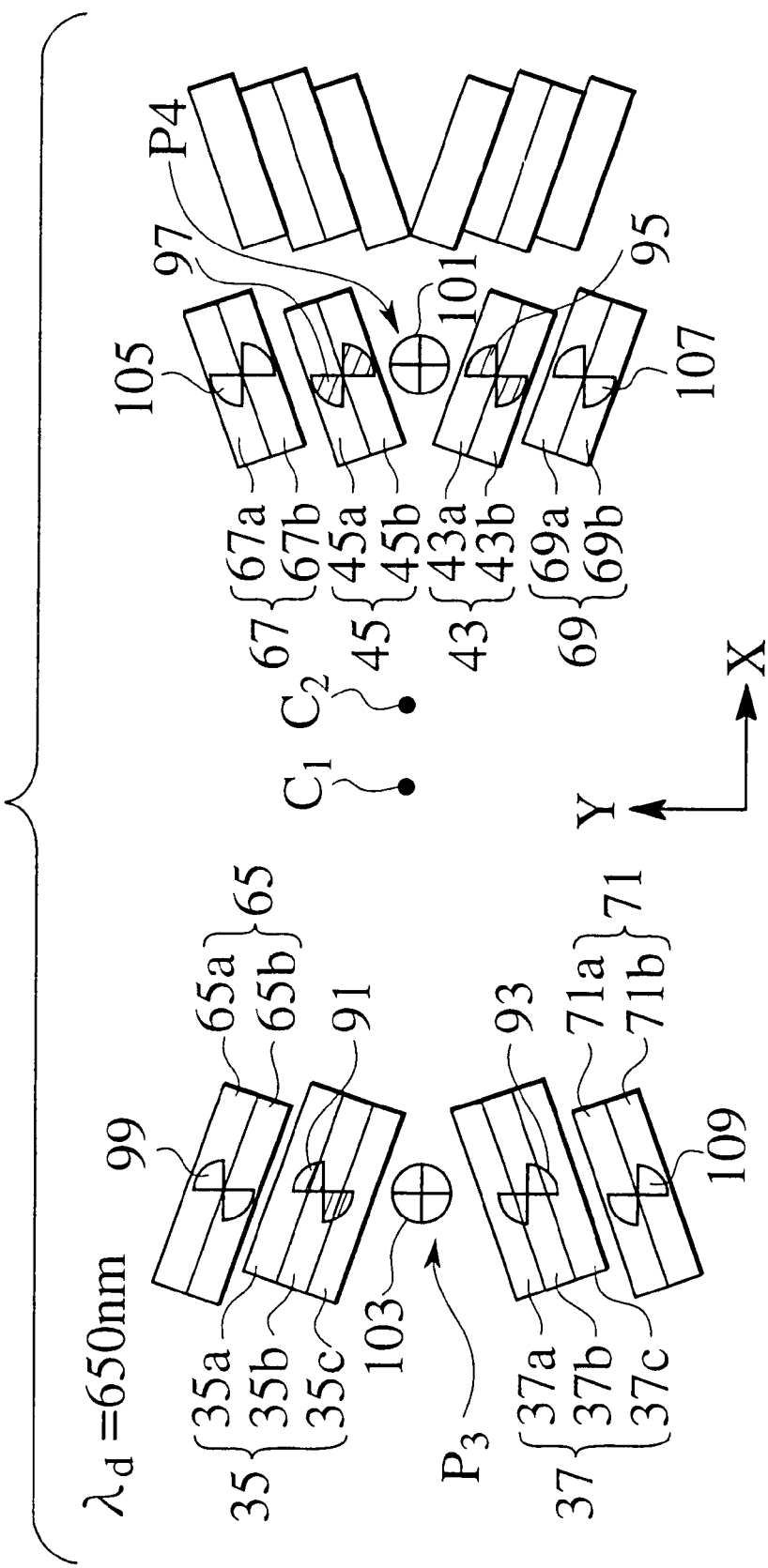
FIG. 19 is an explanatory view showing the spot of a DVD laser light incident upon the light receiving element in the third embodiment.

Additionally, as shown in FIGS. 18 and 19, the first and second light receiving elements 35 and 37 are divided into three areas 35a, 35b, 35c, and 37a, 37b, 37c aligned in the Y axis direction, respectively. Similarly, the third, fourth, fifth, sixth light receiving elements 43, 45, 47, 49 are provided with two light receiving areas 43a and 43b, 45a and 45b, 47a and 47b, and 49a and 49b aligned in the Y axis direction, respectively.

Moreover, in order to receive the −1st order diffracted light of the side beams B1, B2 in the CD laser light (hereinafter referred to as the CD side beam) by the first area 29, the eight and seventh light receiving elements 57 and 55 are disposed on both sides of the fifth light receiving element 47 (aligned position in the Y axis direction). Furthermore, to receive the −1st order diffracted light of the CD side beams B1 and B2 by the second area 31, the tenth and ninth light receiving elements 58 and 56 are disposed on both sides of the sixth light receiving element 49.

Additionally, to receive the +1st order diffracted light of the DVD side beam B1 by the first area 29, an eleventh light receiving element 65 is disposed outside the first light receiving element 35 (on the side apart from the axis w in the Y axis direction), and to receive the −1st order diffracted light of the DVD side beam B1 by the second area 31, a twelfth light receiving element 67 is disposed outside the fourth light receiving element 45 (additionally, the axis w is an axis on the light receiving element substrate, which connects the axes A1 and A2 determined by the 0th order transmitted lights of the DVD and CD main beams as shown in the drawing).

Moreover, a thirteenth light receiving element 69 is disposed outside the third light receiving element 43 to receive the −1st order diffracted light of the DVD side beam B2 by the first area 29. Furthermore, a fourteenth light receiving element 71 is disposed outside the second light receiving element 37 to receive the +1st order diffracted light of the DVD side beam B2 by the second area 31.

Additionally, as shown in FIGS. 18, 19, the eleventh, twelfth, thirteenth, fourteenth light receiving elements 65, 67, 69, 71 are divided into two light receiving areas 65a and 65b, 67a and 67b, 69a and 69b, and 71a and 71b aligned in the Y axis direction, respectively.

First an action on the CD laser light will be described hereinafter.

FIG. 18 shows a state in which the diffracted light of the CD laser light is incident upon the respective light receiving elements in the optical device 23.

As shown in FIG. 18, the +1st order diffracted light of the main beam B0 by the first area 29 is incident upon the first light receiving element 35 to form a double fan-shaped spot 75, and the −1st order diffracted light is incident upon the fifth light receiving element 47 to form a double fan-shaped spot 79. Additionally, the shapes of the double fan-shaped spots 75, 79 are analogous to the shape of the hologram first area 29.

Moreover, the +1st order diffracted light of the main beam B0 by the second area 31 is incident upon the second light receiving element 37 to form a double fan-shaped spot 77 and the −1st order diffracted light is incident upon the sixth light receiving element 49 to form a double fan-shaped spot 85.

Furthermore, the −1st order diffracted light of the first side beam B1 by the hologram first area 29 is incident upon the ninth light receiving element 57 to form a double fan-shaped spot 83. Additionally, the −1st order diffracted light of the first side beam B1 by the hologram second area 31 is incident upon the tenth light receiving element 58 to form a double fan-shaped spot 89.

Moreover, the −1st order diffracted light of the second side beam B2 by the hologram first area 29 is incident upon the seventh light receiving element 55 to form a double fan-shaped spot 81. The −1st order diffracted light of the second side beam B2 by the hologram second area 31 is incident upon the eighth light receiving element 56 to form a double fan-shaped spot 87.

Furthermore, when the hologram first and second areas 29, 31 are provided with the lens power, for example, the lens power is applied in such a manner that the area acts on the diffracted light rc1 as convex lens, and acts on the diffracted light rc2 as the concave lens. Specifically, the convex lens power is applied to the diffracted light for generating the spot 75, and the concave lens power is applied to the diffracted light for generating the spot 77.

Therefore, based on the outputs from the light receiving areas 35a to 35c of the first light receiving element 35 and the outputs from the light receiving areas 37a to 37c of the second light receiving element 37, the focus error signal of the CD laser can be obtained. More specifically, when the sum of outputs from the light receiving areas 35b, 37a, 37c is S1, and the sum of outputs from the light receiving areas 35a, 35c, 37b is S2, the focus error signal FE is given by:

$$FE = S1 - S2.$$

Moreover, the tracking error signal TE with respect to the CD laser light can be detected by the signals from the fifth, seventh, eighth, sixth, ninth, tenth light receiving elements 47, 55, 57, 49, 56, 58. More specifically, when the sum of outputs from the seventh and ninth light receiving elements 55 and 56 is E, and the sum of outputs from the eighth and tenth light receiving elements 57 and 58 is F, the tracking error signal TE is given by:

$$TE = E - F.$$

Additionally, the recording signal RF is detected as the sum of outputs from the light receiving elements 35, 37, 47, 49.

An action on the DVD laser light will next be described.

FIG. 19 shows a state in which the diffracted light of the DVD laser light is incident upon the respective light receiving elements in the optical device 23.

As shown in FIG. 19, the +1st order diffracted light of the main beam B0 by the first area 29 is incident upon the light receiving element 35 to form a double fan-shaped spot 91, and the −1st order diffracted light is incident upon the third light receiving element 43 to form a double fan-shaped spot 95. Moreover, the +1st order diffracted light of the main beam B0 by the second area 31 is incident upon the second light receiving element 37 to form a double fan-shaped spot 93 and the −1st order diffracted light is incident upon the fourth light receiving element 45 to form a double fan-shaped spot 97.

Furthermore, the +1st order diffracted light of the first side beam B1 by the hologram first area 29 is incident upon the light receiving element 65 to form a double fan-shaped spot 99, and the −1st order diffracted light is incident upon a middle point P4 between the light receiving elements 43 and 45 to form a spot 101. Moreover, the +1st order diffracted light of the first side beam B1 by the hologram second area 31 is incident upon a middle point P3 between the light receiving elements 35 and 37 to form a spot 103, and the −1st order diffracted light forms a double fan-shaped spot 105 in the light receiving element 67.

Furthermore, the +1st order diffracted light of the second side beam B2 by the hologram first area 29 is superposed upon the spot 103 in the middle point P3 between the light receiving elements 35 and 37, and the −1st order diffracted light is incident upon the thirteenth light receiving element 69 to form a double fan-shaped spot 107. The +1st order diffracted light of the second side beam B2 by the hologram second area 31 is incident upon the fourteenth light receiving element 71 to form a double fan-shaped spot 109, and the −1st order diffracted light is superposed upon the spot 101 in the middle point P4 between the light receiving elements 43 and 45.

As described above, the convex lens power is applied to the +1st order diffracted light for generating the spot 91, and the concave lens power is applied to the +1st order diffracted light for generating the spot 93. Therefore, based on the output signals from the light receiving areas 35a, 35b, 35c and the output signals from the light receiving areas 37a, 37b, 37c, the focus error signal by the complementary spot size method can be obtained. More specifically, when the sum of outputs from the light receiving areas 35b, 37a, 37c is S1, and the sum of outputs from the light receiving areas 35a, 35c, 37b is S2, the focus error signal FE is given by:

$$FE = S1 - S2.$$

Moreover, based on the outputs from the light receiving elements 43, 45, 65, 67, 69, 71 the tracking error signal of the 3-beam DPP method can be detected.

More specifically, detection is as follows.

In general the tracking error signal of the 3-beam DPP method is detected as follows.

Figure 20:
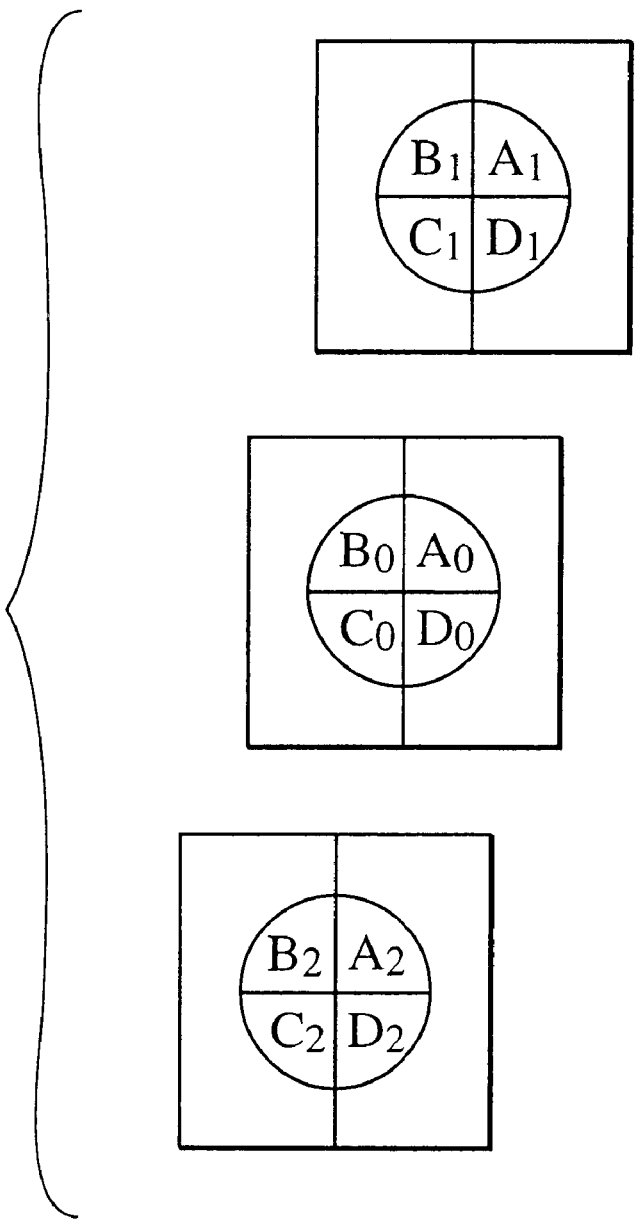
FIG. 20 is an explanatory view showing strength of a main beam B0 and side beams B1, B2 incident upon the holographic optical element 33.

For example, as shown in FIG. 20, when strengths of the main beam B0 incident upon the holographic optical element 33 are set to A0, B0, C0, D0 in a counterclockwise direction, the strengths of the first side beam B1 are set to A1, B1, C1, D1, and the strengths of the second side beam B2 are set to A2, B2, C2, D2, a tracking error signal TEdpp of the three beam DPP system is given by the following equation.

$$TEdpp = [(A0+D0)-(B0+C0)] - k[(A1+D1+A2+D2)-(B1+C1+B2+C2)] \quad (2)$$

Here, k denotes a constant determined in accordance with the standard of the disc or the like, and has a size of the order of 1 to 10.

Figure 21:
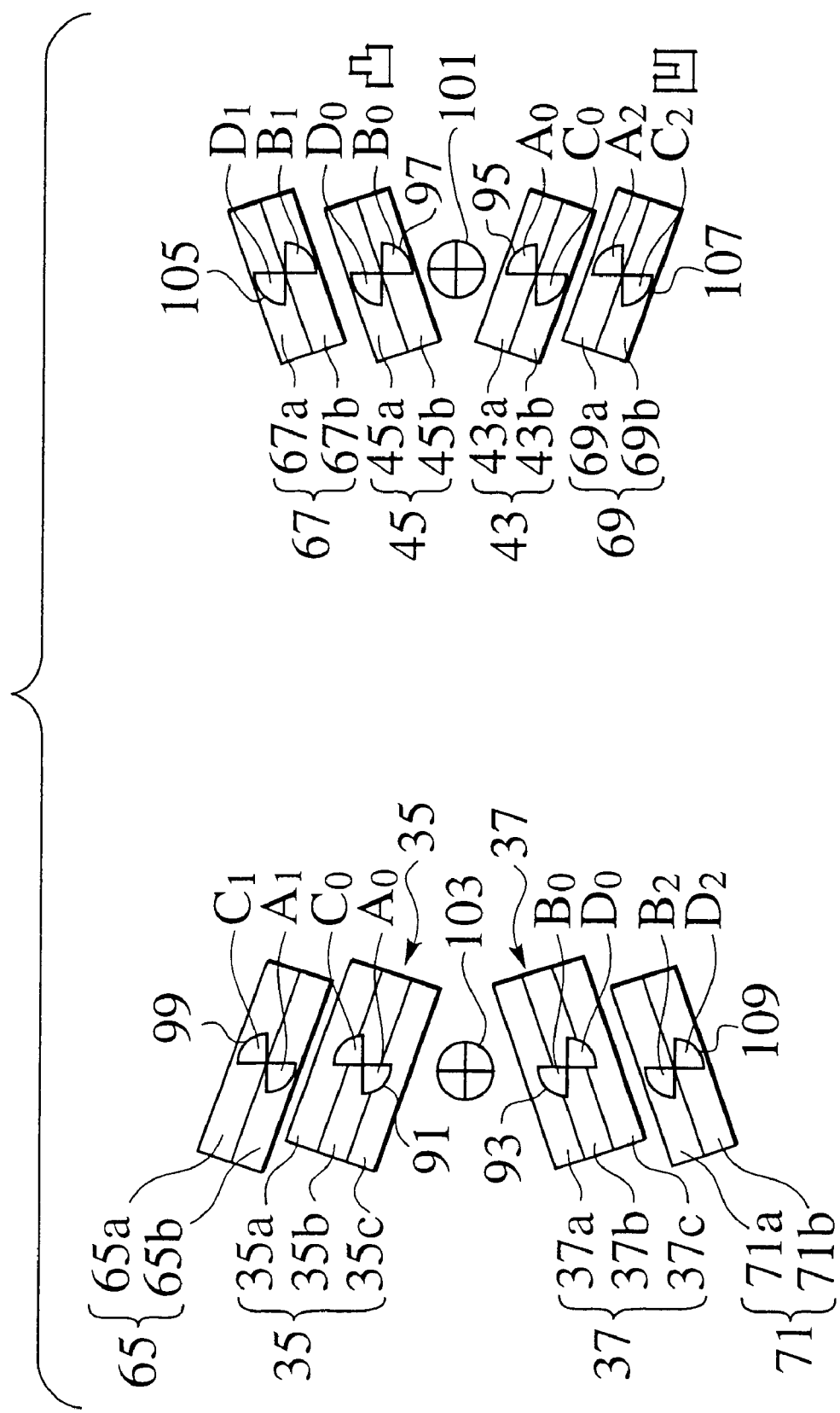
FIG. 21 is an explanatory view showing a relation between a double fan-shaped spot of the diffracted light incident upon the light receiving element and a light receiving area of the light receiving element.

FIG. 21 is an explanatory view showing a relation between the double fan-shaped spots of the diffracted lights incident upon the light receiving elements 43, 45, 65, 67, 69, 71 and the light receiving areas of the light receiving elements.

As shown in FIG. 21, the double fan-shaped spot 95 on the third light receiving element 43 has a strength proportional to the light strengths A0, C0 in the first area, and the spot 97 on the light receiving element 45 has a strength proportional to the light strengths B0, D0 in the second area 31.

Moreover, in the constitution shown in FIG. 21, a right upper fan portion of the spot 95 having the strength A0 is incident upon a light receiving area 43a, and a left lower fan portion having the strength C0 is incident upon a light receiving area 43b.

Similarly, a right lower fan portion of the spot 97 having the strength B0 is incident upon a light receiving area 45b, and a left upper fan portion having the strength D0 is incident upon a light receiving area 45a in the constitution.

Therefore, based on the sum of outputs from the light receiving areas 43a and 45a, a right-side light strength of the main beam B0 in the incident position upon the holographic optical element 33 can be detected. Similarly, based on the sum of outputs from the light receiving areas 43b and 45b, a left-side light strength of the main beam B0 in the incident position upon the holographic optical element 33 can be detected.

Here, reasons why the strength of the right lower fan portion of the spot 97 is proportional to the strength B0, the strength of the left upper fan portion is proportional to D0, and strength arrangement in the second area on the original holographic optical element is reversed are that the diffracted light for generating the spot 97 is provided with the plus lens power and an image is reversed.

Similarly, the right-side light intensity during incidence of the first side beam on the holographic optical element is detected as the sum of outputs from the light receiving areas 65b, 67a, and the left-side light intensity is detected as the sum of outputs from the light receiving areas 65a, 67b.

Furthermore, the right-side light intensity during input of the second side beam to the holographic optical element is detected as the sum of outputs from the light receiving areas 69a, 71b, and the left-side light intensity is detected as the sum of outputs from the light receiving areas 71a, 69b.

Therefore, when the sum of outputs of the light receiving areas 43a, 45a is MR, the sum of outputs of the light receiving areas 45b, 43b is ML, the sum of outputs of the light receiving areas 65b, 67a, 69a, 71b is SR, and the sum of outputs of the light receiving areas 67b, 65a, 71a, 69b is SL, the tracking error signal TEdpp of the 3-beam DPP system is given by:

$$TEdpp = (MR-ML) - k(SR-SL).$$

Here the constant k is the same as the constant k in the equation (2).

Additionally, the recording signal RF is detected as the sum of outputs from the light receiving elements 35, 37, 43, 45.

Figure 22:
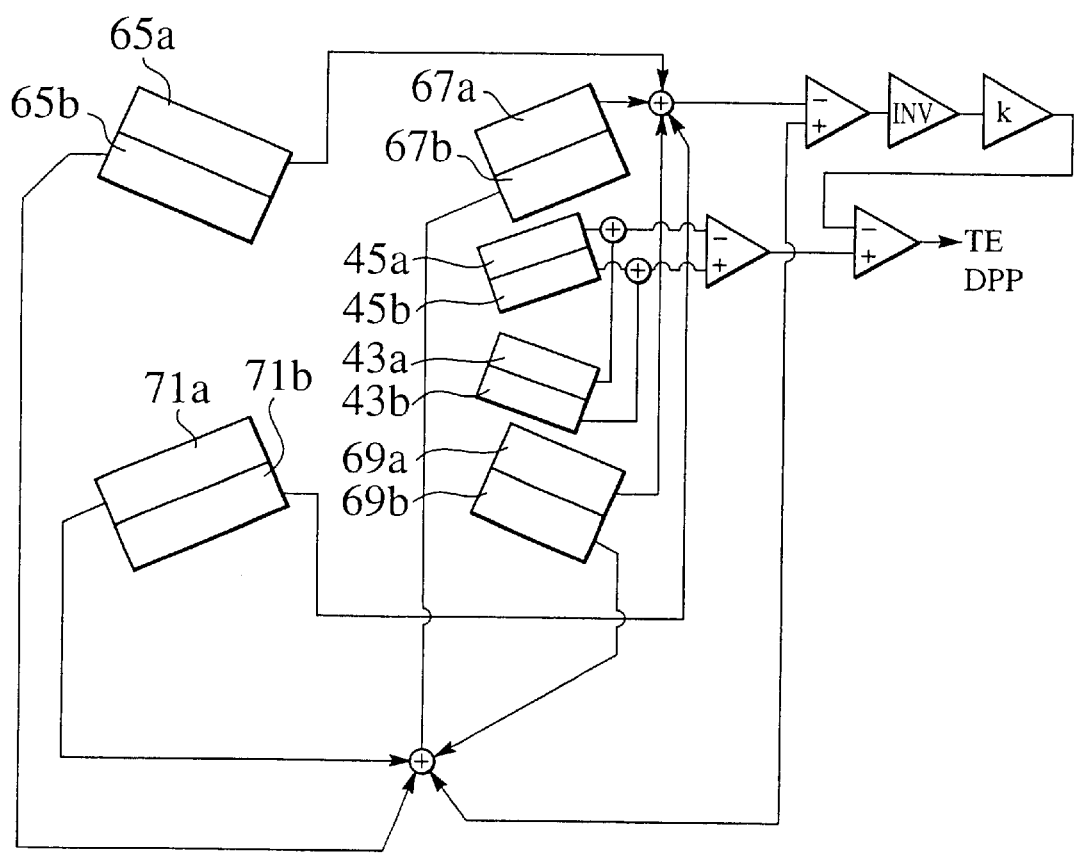
FIG. 22 is a circuit diagram for detecting a tracking error of DVD laser light by DPP system.

FIG. 22 shows one example of an electric circuit for obtaining the tracking error signal TEdpp of DPP system based on the outputs from the light receiving areas 43a, 43b, 45a, 45b, 65a, 65b, 67a, 67b, 69a, 69b, 71a, 71b.

Additionally, in the optical pickup, boundary lines and division lines of the light receiving areas 43a, 43b, 45a, 45b, 65a, 65b, 67a, 67b, 69a, 69b, 71a, 71b are disposed in parallel to the X axis. Therefore, even when the holographic optical element spot shifts in the X axis direction by wavelength fluctuation, the spot only moves along the boundary line or the division line of the light receiving area. Therefore, error generation by the wavelength fluctuation of the detection laser light can be avoided.

As described above, according to the embodiment, in the integrated pickup in which compatible reproduction of a CD, DVD or the like is possible, and small size, high rate and low cost can be realized, without causing cost up or performance deterioration, the tracking error detection of the 3-beam DPP system for a DVD-RAM is possible, and the influence of lens shift or the like can be minimized.

Therefore, this can realize the optical pickup, disc drive, player and optical disc recorder which are small in size and low in cost and which can perform compatible reproduction of a multiplicity of standards.

Meanwhile, in the aforementioned embodiment, the light receiving area and division line are set in a direction inactive to the wavelength fluctuation, but in this case, several degrees of deviations are generated from the diffraction light movement direction (radial axis direction) by objective lens movement. When the objective lens position largely changes, focus error signal detecting sensitivity deterioration, offset generation, jitter, and error rate deterioration are caused.

In the following embodiment, in consideration of this, in the optical device in which the diffraction direction incompletely agrees with the radial axis, and the hologram or another diffraction element is used, with respect to a plurality of error factors such as wavelength fluctuation, diffraction element position error, relative position error between the light emitting element and the light receiving element, and diffracted light movement caused by a tracking operation, allowance distribution is performed without any deviation, and overall allowances of respective element dispersions and assembly are satisfied.

Specifically, the direction of the light receiving area and division line is determined to be different from the diffraction direction and radial axis direction and to indicate the predetermined angle in the middle of both directions. By the constitution, there is provided a balanced and highly practical optical device having a certain degree of allowance with respect to all the error factors.

<Fourth Embodiment>

A fourth embodiment will concretely be described hereinafter.

Figure 23:
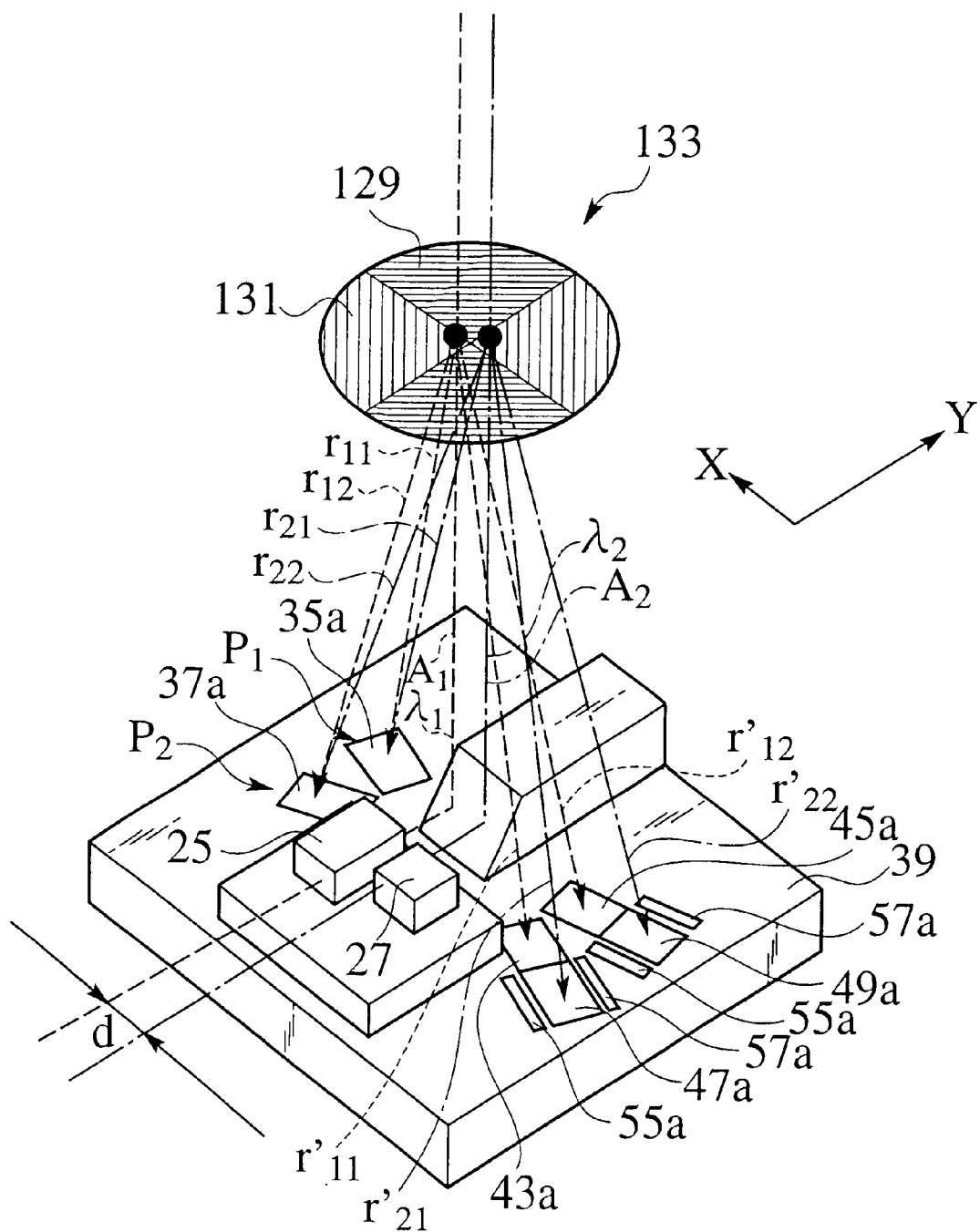
FIG. 23 is a schematic perspective view of a fourth embodiment of the optical device of the present invention.
Figure 24:
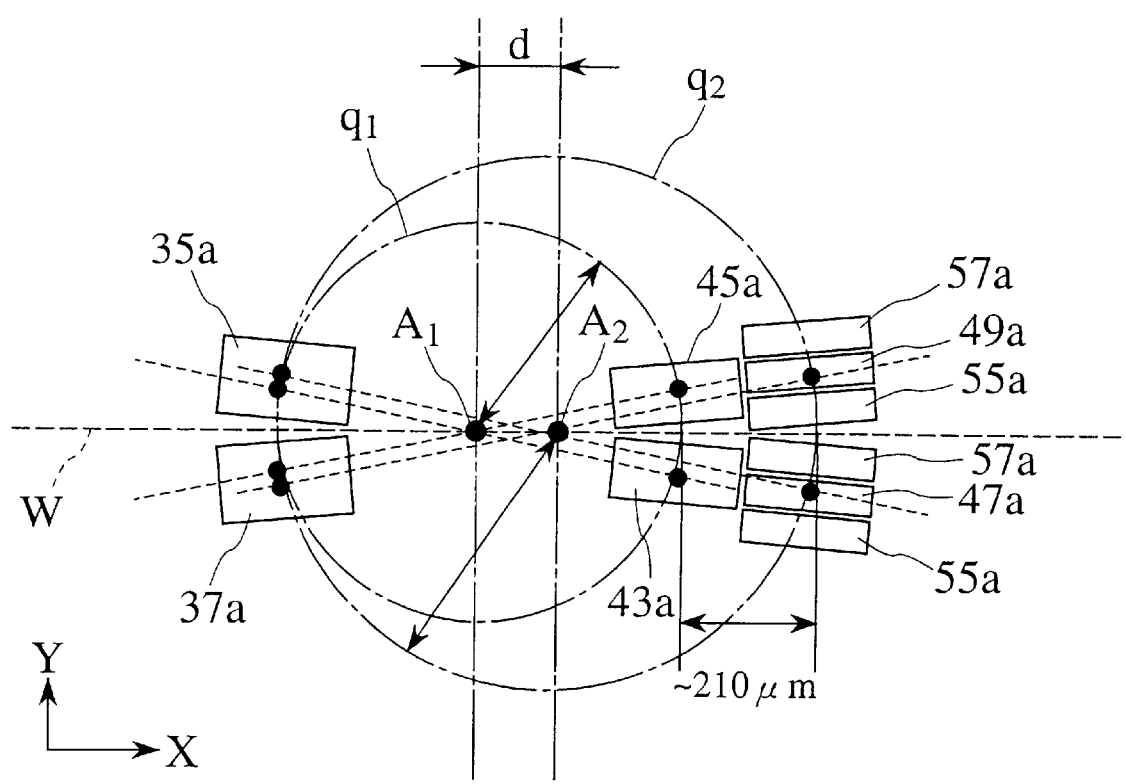
FIG. 24 is an explanatory plan view showing the positions of two light sources and light receiving element in the fourth embodiment.

Specifically, as shown in FIG. 23, the optical device is provided with the first light source 25 for outputting the light of the first wavelength $\lambda 1$, and the second light source 27 for outputting the light of the second wavelength $\lambda 2$. Here, the first wavelength $\lambda 1$ is, for example, 650 nm for a DVD, and the second wavelength $\lambda 2$ is, for example, 780 nm for a CD. The interval d between the light emitting points of the light source 25, 27 is set, for example, to about 104 $\mu$m.

Additionally, similarly as the second embodiment the interval between the light receiving element substrate 39 and the holographic optical element 133 is set, for example, to 3000 $\mu$m.

By the aforementioned constitution, the DVD luminous flux emitted from the first light source 25 and provided with the first wavelength is reflected by the information recording medium (not shown), and subsequently diffracted by the first diffraction area 129 and second diffraction area 131 to produce the ±1st order diffracted lights r11, r12, r11', r12'. Subsequently, the +1st order diffracted light r11 by the first diffraction area 129 is converged to a first light receiving element 35a, and the +1st order diffracted light r12 by the second diffraction area 131 is converged to a second light receiving element 37a. On the other hand, the −1st order diffracted lights r11', r12' by the first diffraction area 129 and second diffraction area 131 are converged to the third light receiving element 43a and fourth light receiving element 45a, respectively.

Moreover, the CD luminous flux provided with the second wavelength from the second light source 27 is reflected by the information recording medium (not shown), then diffracted by the first and second diffraction areas 129, 131 to produce the ±1st order diffracted lights r21, r22, r21', r22'. Subsequently, the +1st order diffracted light r21 by the first diffraction area 129 is converged to the first light receiving element 35a, and the +1st order diffracted light r22 by the second diffraction area 131 is converged to the second light receiving element 37a. On the other hand, the −1st order diffracted lights r21', r22' by the first diffraction area 129 and second diffraction area 131 are converged to a fifth light receiving element 47a and a sixth light receiving element 49a, respectively.

In the design for applying the lens power to the first diffraction area 129 and second diffraction area 131, the concave lens action is applied to the diffracted lights r11, r21, and the convex lens action is applied to the diffracted lights r12, r22. Therefore, similarly as the second embodiment, the focus error signal by the complementary spot size method can be obtained on the basis of the outputs from the first light receiving element 35a and second light receiving element 37a.

Moreover, similarly as the second embodiment, based on the outputs from the third light receiving element 43a and fourth light receiving element 45a, the tracking error signal of the DVD luminous flux having the first wavelength can be obtained.

Furthermore, based on the output signals from fifth and sixth light receiving elements 47a, 49a, the tracking error signal of the CD-R luminous flux having the second wavelength can be obtained.

Figure 25A:
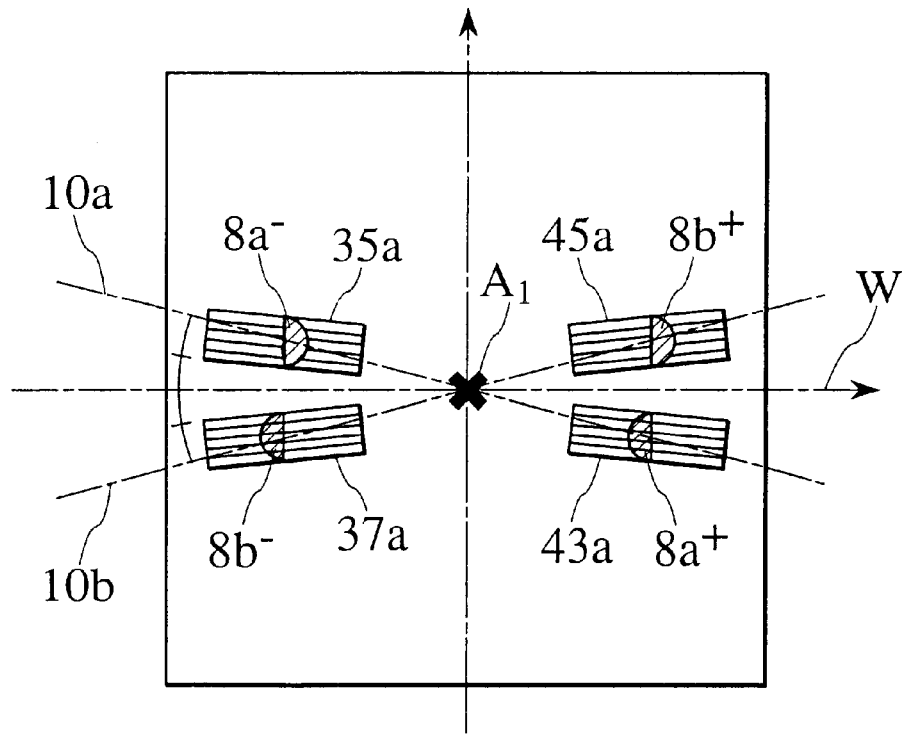
FIGS. 25A and 25B are explanatory views showing the relation between the spot of the diffracted light incident upon the light receiving element and the light receiving area of the light receiving element.
Figure 25B:
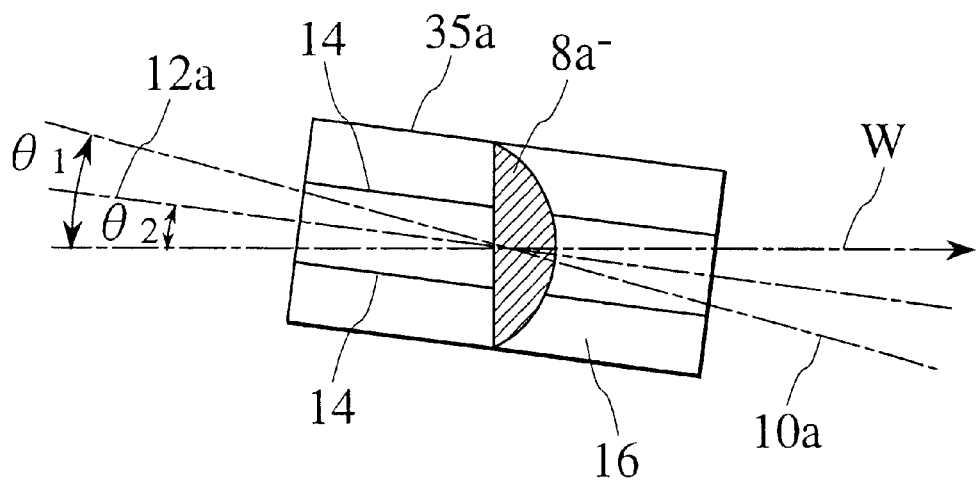

FIG. 25A is an explanatory view showing the relation between the spot of the diffracted light incident upon the light receiving element and the light receiving area of the light receiving element, and FIG. 25B is a partial enlarged view.

Here, since each of the light receiving elements 35a, 37a, 43a, 45a allows spot position movement centering on and including a standard spot position and caused by the respective error factors, a rectangular shape long in one direction with respect to spots 8a +, 8a −, 8b +, 8b − is formed. Moreover, since the focus error signal, tracking error signal, and other signals are computed/generated, the light receiving area is further divided into a plurality of sub areas 16 by a division line 14, but this division line 14 is set to be substantially parallel to a side of a longitudinal direction 12 in the rectangular light receiving area.

An inclination angle $\theta_2$ of the longitudinal direction side of the rectangle and the dividing line 14 to the radial axis is determined to satisfy the following relation with respect to an angle $\theta_1$ of diffraction directions 10a, 10b to the radial axis:

$$0<\theta_2<\theta_1.$$

Further specifically, the angle is determined to satisfy the following:

$$(\Delta L + \Delta h)\sin(\theta_1-\theta_2)=(\Delta x+\Delta r)\sin\theta_2;$$

or $$(k_1\Delta L+k_2\Delta h)\sin(\theta_1-\theta_2)=(k_2\Delta x+\Delta r)\sin\theta_2,$$

where $0<k_1<1$ and $0<k_2<1$.

Briefly, a direction 12a of each light receiving element and division line 14 is disposed between a radial axis direction W and a diffraction direction 10a.

Figure 26A:
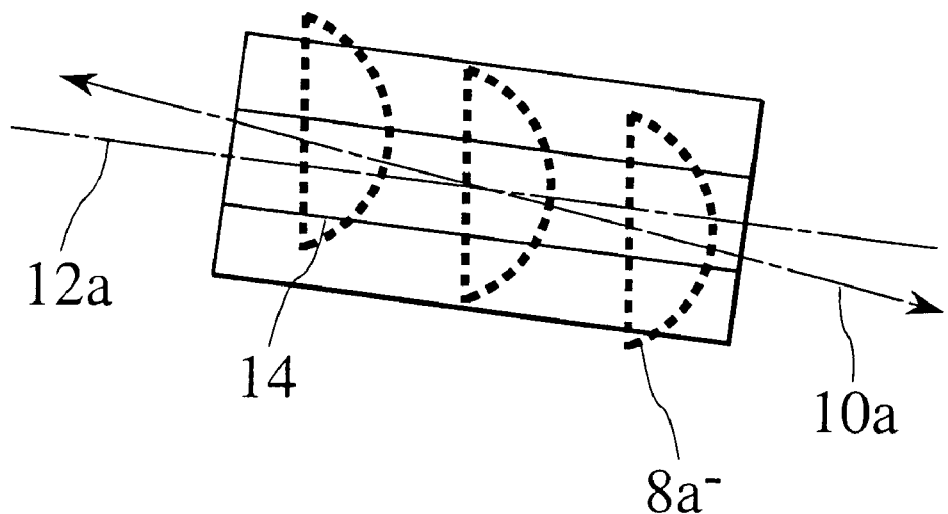
FIG. 26A is an explanatory view showing an influence by wavelength fluctuation of a semiconductor laser and height error of a diffraction element.

Therefore, when the wavelength fluctuation of the semiconductor laser as the light source and the height of the diffraction element are postulated as the error factors, as shown in FIG. 26A, the spot position slightly fluctuates with respect to the division line 14, but it is apparent that the fluctuation is smaller than that of the second embodiment (the diffraction direction agrees with the longitudinal direction of the light receiving element).

Figure 26B:
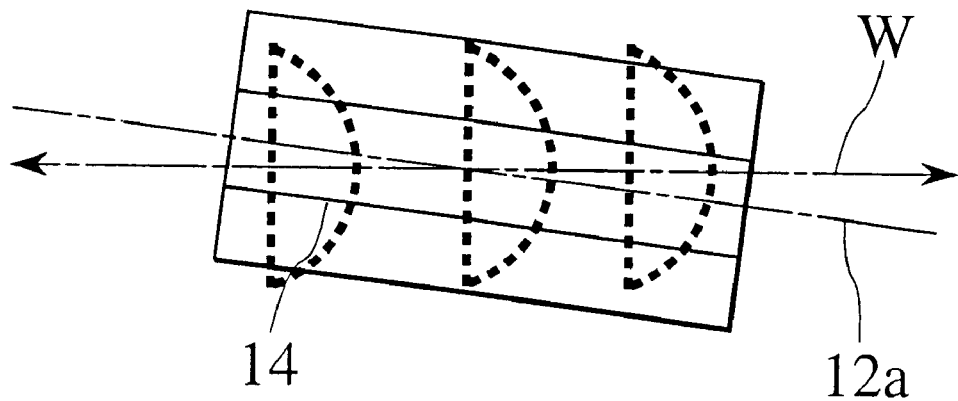
FIG. 26B is an explanatory view showing an influence by a relative position error in a radial direction of an optical axis and light receiving element.

Similarly, also with respect to the relative position error of the radial direction of the optical axis and light receiving element, or the position error of the objective lens caused by the tracking movable range as another error factor, as shown in FIG. 26B, the spot position slightly fluctuates with respect to the division line 14, but it is apparent that the fluctuation is smaller than that of the second embodiment.

As described above, according to the fourth embodiment, with respect to the semiconductor laser wavelength fluctuation and the diffraction element height, slight influence is exerted, but with respect to the relative position error of the radial direction of the optical axis and light receiving element, the position error of the objective lens caused by the tracking movable range, and the like, influence can be moderated. For example, with $\theta_2=0.5\times\theta_1$, the influence of the latter position error can be reduced by half.

As described above, according to the fourth embodiment, in the integrated pickup which is applied to high-density discs such as a DVD and the small size, high speed and low cost can be satisfied, even when the diffraction direction of hologram or the like disagrees with the radial axis direction, with respect to a plurality of error factors such as wavelength fluctuation, diffraction element position error, relative position error of the light emitting element and light receiving element, and diffracted light movement caused by the tracking operation, the allowance distribution is performed without any dispersion, the total allowance for each element dispersion and assembly can be satisfied, every error factor is provided with a certain degree of allowance, and the balanced and highly practical optical device can be realized.

It should be understood that many modifications and adaptations of the invention will become apparent to those skilled in the art and it is intended to encompass such obvious modifications and changes in the scope of the claims appended hereto.

What is claimed is:

1. An optical device for reading information from an information recording medium, comprising:
    a first light source for outputting a light of a first wavelength;
    a second light source for outputting a light of a second wavelength;
    a holographic optical element having a first diffraction area and a second diffraction area for diffracting the lights of said first and second wavelengths; and
    a light receiving element substrate, provided with a first light receiving element and a second light receiving element for receiving a diffracted light from said holographic optical element, wherein
    said first diffraction area and the second diffraction area have grating arrangements whose grating axis directions are parallel to each other and whose grating pitches are different from each other, and light emitting points of said first and second light sources are apart from each other by a predetermined distance in a direction crossing at right angles to said grating axis,
    the grating pitches of said first diffraction area and the second diffraction area are determined in such a manner that:
        when a distance (L11; L12) between an incident position of the diffracted light of said first wavelength to the surface of said light receiving element substrate by the first diffraction area or the second diffraction area, and an optical axis determined by a 0th order transmitted light of the first wavelength is a first distance, and a distance (L21; L22) between an incident position of the diffracted light of said second wavelength to said light receiving element substrate surface by the same diffraction area, and the optical axis determined by the 0th order transmitted light of the second wavelength is a second distance, a difference (|L11−L21|; |L12−L22|) between said first distance and the second distance becomes equal to an interval between the light emitting points of said first and second light sources; and
        an interval (|L11−L12|; |L21−L22|) between the incident position of the diffracted light of said first or second wavelength to said light receiving element substrate surface by said first diffraction area, and the incident position of the diffracted light of the same wavelength to said light receiving element substrate surface by the second diffraction area becomes equal to the interval between said light emitting points,
            the diffracted lights of the first wavelength and the second wavelength by said first diffraction area are converged to substantially the same first position on said light receiving element substrate, and the diffracted lights of the first wavelength and the second wavelength by said second diffraction area are converged to substantially the same second position on said light receiving element substrate, and
            the first and second light receiving elements are disposed in said first and second positions, respectively.

2. The optical device according to claim 1 wherein a focus error signal is obtained on the basis of signals from said first light receiving element and the second light receiving element.

3. The optical device according to claim 1 wherein the diffracted lights to said first and second positions are both +1st order diffracted lights by said first diffraction area and the second diffraction area, and the interval between the light emitting points of said first and second light sources and the grating pitches of said first diffraction area and the second diffraction area are set in such a manner that −1st order diffracted lights of said first wavelength and the second wavelength by said first diffraction area and the second diffraction area are converged to third, fourth, fifth, sixth positions apart from one another by a predetermined interval capable of receiving the lights in independent light receiving areas not superposed to one another on said light receiving element substrate.

4. The optical device according to claim 3 wherein the −1st order diffracted lights of said first wavelength by said first diffraction area and the second diffraction area are converged to said third and fourth positions, the −1st order diffracted lights of said second wavelength by said first diffraction area and the second diffraction area are converged to said fifth and sixth positions, a tracking error signal for the first wavelength is obtained on the basis of detection signals from the light receiving elements disposed in said third and fourth positions, and a tracking error signal for the second wavelength is obtained on the basis of the signals from the light receiving elements disposed in said fifth and sixth positions, or the signals from the light receiving elements disposed on both side areas opposite to each other in a grating axis direction of said fifth or sixth position.

5. The optical device according to claim 4 wherein when said information recording medium is a CD-R, the tracking error signal for said second wavelength is obtained on the basis of the signals from the light receiving elements disposed in said fifth and sixth positions.

6. An optical device for reading information from an information recording medium, comprising:
   a first light source for outputting a light of a first wavelength;
   a second light source for outputting a light of a second wavelength;
   a holographic optical element having a first diffraction area and a second diffraction area for diffracting the lights of said first and second wavelengths; and
   a light receiving element substrate provided with a first light receiving element and a second light receiving element for receiving a diffracted light from said holographic optical element, wherein
   in said first diffraction area and the second diffraction area, grating pitches are identical with each other, grating axis directions are different from each other by a predetermined angle of 30° or less, and light emitting points of said first and second light sources are apart from each other by a predetermined distance in a direction crossing at right angles to said grating axis direction,
   the grating pitches of said first diffraction area and the second diffraction area are determined in such a manner that:
      when a distance between an incident position of the diffracted light of said first wavelength to the surface of said light receiving element substrate by the first diffraction area or the second diffraction area, and an optical axis determined by a 0th order transmitted light of the first wavelength is a first distance, and a distance between an incident position of the diffracted light of said second wavelength to the surface of said light receiving element substrate by the same diffraction area, and the optical axis determined by the 0th order transmitted light of the second wavelength is a second distance, a difference between said first distance and the second distance becomes equal to an interval between the light emitting points of said first and second light sources,
   directions of said first diffraction area and the second diffraction area are determined in such a manner that:
      the diffracted lights of the first wavelength and the second wavelength by said first diffraction area are converged to substantially the same first position on said light receiving element substrate; and
      the diffracted lights of the first wavelength and the second wavelength by said second diffraction area are converged to substantially the same second position apart from said first position by a predetermined distance in a direction crossing at right angles to the apart direction of said light emitting points on said light receiving element substrate, and
      the first and second light receiving elements are disposed in said first and second positions, respectively.

7. The optical device according to claim 6 wherein a focus error signal is obtained on the basis of signals from said first light receiving element and the second light receiving element.

8. The optical device according to claim 6 wherein the diffracted lights to said first and second positions are both +1st order diffracted lights by said first diffraction area and the second diffraction area, a tracking error signal of the light of said first wavelength is obtained on the basis of signals from the light receiving elements disposed in the third and fourth positions in which the −1st order diffracted lights of said first wavelength by said first diffraction area and the second diffraction area are converged on said light receiving element substrate, and a tracking error signal of the light of said second wavelength is obtained on the basis of the signals from the light receiving elements disposed in the fifth and sixth positions in which the −1st order diffracted light of said second wavelength by said first diffraction area or the second diffraction area is converged on said light receiving element substrate, or the signals from the light receiving elements disposed on both side areas opposite to each other in a grating axis direction of the fifth position or the sixth position.

9. The optical device according to claim 7 wherein said first light receiving element and the second light receiving element are divided into a plurality of sub areas by a plurality of division lines, and the focus error signal is obtained on the basis of the signals from the plurality of sub areas.

10. The optical device according to claim 9 wherein when a point at which said 0th order transmitted light intersects said light receiving element substrate is P, an angle formed by a radial axis defined in a radial direction crossing at right angles to a track of said information recording medium and a straight line connecting said first or second position to said intersection point P is $\theta_1$, and an angle formed by said radial axis and said plurality of division lines is $\theta_2$, a relation of $0<\theta_2<\theta_1$ is satisfied.

11. The optical devise according to claim 8 wherein when said information recording medium is a CD-R, the tracking error signal for said second wavelength is obtained on the basis of the signals from the light receiving elements disposed in said fifth and sixth positions.

* * * * *